(12) United States Patent
Wang et al.

(10) Patent No.: US 9,167,296 B2
(45) Date of Patent: Oct. 20, 2015

(54) CUSTOMIZED PLAYBACK AT SINK DEVICE IN WIRELESS DISPLAY SYSTEM

(71) Applicant: QUALCOMM Incorporated, San Diego, CA (US)

(72) Inventors: Xiaodong Wang, San Diego, CA (US); Fawad Shaukat, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 568 days.

(21) Appl. No.: 13/633,344

(22) Filed: Oct. 2, 2012

(65) Prior Publication Data
US 2013/0223538 A1 Aug. 29, 2013

Related U.S. Application Data

(60) Provisional application No. 61/604,086, filed on Feb. 28, 2012, provisional application No. 61/604,087, filed on Feb. 28, 2012, provisional application No. 61/604,090, filed on Feb. 28, 2012, provisional application No. 61/604,094, filed on Feb. 28, 2012.

(51) Int. Cl.
*H04N 7/52* (2011.01)
*H04N 21/44* (2011.01)
(Continued)

(52) U.S. Cl.
CPC .......... *H04N 21/44004* (2013.01); *G06F 3/038* (2013.01); *H04N 21/4307* (2013.01); *H04N 21/43637* (2013.01); *G09G 2370/16* (2013.01)

(58) Field of Classification Search
CPC .......... H04N 21/2368; H04N 21/4341; H04N 21/4307; H04N 21/4305; H04N 21/43637; H04N 5/04

USPC .......................................... 370/217, 221, 225
See application file for complete search history.

(56) References Cited

U.S. PATENT DOCUMENTS 5,502,573 A * 3/1996 Fujinami ....................... 386/207
6,373,855 B1 4/2002 Downing et al.
(Continued)

FOREIGN PATENT DOCUMENTS

EP 1359748 A1 11/2003
EP 1643775 A1 4/2006
(Continued)

OTHER PUBLICATIONS

International Search Report and Written Opinion—PCT/US2013/028389—ISA/EPO—Jul. 5, 2013.

*Primary Examiner* — Sath V Perungavoor
*Assistant Examiner* — Clifford Hilaire
(74) *Attorney, Agent, or Firm* — Donald C. Kordich

(57) ABSTRACT

This disclosure describes techniques to improve a user experience in a Wireless Display (WD) system. The WD system includes a source device that provides media data to one or more sink devices. The techniques are directed toward reducing end-to-end latency in the WD system while improving video playback quality at the sink devices. More specifically, the techniques include customized playback at the sink devices based on the type of media data received from the source device. If the media data only includes video data and does not include audio data, a processing pipeline of the sink device is configured to render the video data without waiting to synchronize with non-existent audio data. If the media data includes both video data and audio data, an audio rendering start-up timer is reduced and the processing pipeline renders synchronized audio and video data according to the reduced start-up timer.

46 Claims, 11 Drawing Sheets

(51) Int. Cl.
*G06F 3/038* (2013.01)
*H04N 21/43* (2011.01)
*H04N 21/4363* (2011.01)

(56) References Cited

U.S. PATENT DOCUMENTS

| | | | |
|---|---|---|---|
| 7,512,698 B1 | 3/2009 | Pawson | |
| 7,596,149 B2 | 9/2009 | Shieh | |
| 7,600,081 B2 | 10/2009 | Sutardja | |
| 7,657,672 B2 | 2/2010 | Kampmann et al. | |
| 7,817,557 B2 | 10/2010 | Woodworth | |
| 7,843,820 B2 | 11/2010 | Lai et al. | |
| 7,865,928 B2 | 1/2011 | Hostyn et al. | |
| 8,024,417 B2 | 9/2011 | Mehrotra | |
| 8,077,745 B2 | 12/2011 | Desineni | |
| 2002/0066007 A1* | 5/2002 | Wise et al. | 712/300 |
| 2002/0194609 A1 | 12/2002 | Tran | |
| 2003/0027517 A1 | 2/2003 | Callway et al. | |
| 2006/0257108 A1 | 11/2006 | Suguta | |
| 2006/0274655 A1 | 12/2006 | Richter et al. | |
| 2007/0153762 A1 | 7/2007 | Park et al. | |
| 2008/0120668 A1 | 5/2008 | Yau | |
| 2008/0263259 A1* | 10/2008 | Sadovsky et al. | 711/100 |
| 2008/0267590 A1 | 10/2008 | Otsuka | |
| 2009/0060032 A1* | 3/2009 | Schmit et al. | 375/240.01 |
| 2009/0060458 A1* | 3/2009 | Bauchot et al. | G11B 27/10 386/200 |
| 2009/0201827 A1 | 8/2009 | Kwon et al. | |
| 2009/0287324 A1 | 11/2009 | Too | |
| 2010/0190478 A1* | 7/2010 | Brewer et al. | 455/414.1 |
| 2010/0295993 A1 | 11/2010 | Oh | |
| 2010/0299448 A1 | 11/2010 | Cuoq | |
| 2010/0316001 A1 | 12/2010 | Enstrom et al. | |
| 2010/0329355 A1 | 12/2010 | Pandey et al. | |
| 2011/0001755 A1 | 1/2011 | Pallister | |
| 2011/0010607 A1* | 1/2011 | Raveendran | H04L 1/0067 714/776 |
| 2011/0069720 A1 | 3/2011 | Jacobs et al. | |
| 2011/0258338 A1 | 10/2011 | Vass | |
| 2011/0283014 A1 | 11/2011 | Malik et al. | |
| 2011/0320953 A1 | 12/2011 | Chen et al. | |
| 2013/0136001 A1 | 5/2013 | Mese | |
| 2013/0222210 A1 | 8/2013 | Wang et al. | |
| 2013/0222699 A1 | 8/2013 | Wang et al. | |
| 2014/0085314 A1* | 3/2014 | Steinke | 345/473 |

FOREIGN PATENT DOCUMENTS

| | | |
|---|---|---|
| EP | 2247044 A1 | 11/2010 |
| WO | 2005034516 A1 | 4/2005 |
| WO | 2008045795 A1 | 4/2008 |

* cited by examiner

CUSTOMIZED PLAYBACK AT SINK DEVICE IN WIRELESS DISPLAY SYSTEM

This application claims the benefit of U.S. Provisional Application No. 61/604,086, filed Feb. 28, 2012; U.S. Provisional Application No. 61/604,087, filed Feb. 28, 2012; U.S. Provisional Application No. 61/604,090, filed Feb. 28, 2012; and U.S. Provisional Application No. 61/604,094, filed Feb. 28, 2012, the entire content of each of which is incorporated herein by reference in its entirety.

TECHNICAL FIELD

The disclosure relates to transmitting data between a wireless source device and a wireless sink device.

BACKGROUND

Wireless display (WD) systems include a source device and one or more sink devices. The source device and each of the sink devices may be either mobile devices or wired devices with wireless communication capabilities. As mobile devices, for example, one or more of the source device and the sink devices may comprise mobile telephones, tablet computers, laptop computers, portable computers with wireless communication cards, personal digital assistants (PDAs), wireless gaming devices, portable media players, or other flash memory devices with wireless communication capabilities. Mobile devices may also include so-called "smart" phones and "smart" pads or tablets, or other types of wireless communication devices. As wired devices, for example, one or more of the source device and the sink devices may comprise televisions, desktop computers, monitors, projectors, and the like, that include wireless communication capabilities.

The source device sends media data, such as audio and/or video data, to one or more of the sink devices participating in a particular communication session. The media data may be played back at both a local display of the source device and at each of the displays of the sink devices. More specifically, each of the participating sink devices renders the received media data on its display and audio equipment. In some cases, a user of a sink device may apply user inputs to the sink device, such as touch inputs and remote control inputs. In the WD system, the user inputs are sent from the sink device to the source device. The source device processes the received user inputs from the sink device and applies the effect of the user inputs on subsequent media data sent to the sink device.

SUMMARY

In general, this disclosure describes techniques to improve a user experience in a Wireless Display (WD) system. The WD system includes a source device that provides media data, e.g., audio and/or video data, to one or more sink devices for playback. The techniques are directed toward reducing end-to-end latency of the media data between the source device and the sink devices while improving video playback quality (i.e., smoothness) at the sink devices.

More specifically, the techniques of this disclosure include customized playback at the sink devices of the WD system based on the type of media data received from the source device. If the media data only includes video data and does not include audio data, a renderer included in a processing pipeline of the sink device is configured to perform accelerated rendering of the video data. For example, upon detecting that the media data does not include audio data, the techniques include disabling synchronization at a renderer included in the processing pipeline of the sink device, and rendering the video data without waiting to synchronize with non-existent audio data. As another example, upon detecting that the media data includes both video data and audio data, the techniques include reducing an audio rendering start-up timer and rendering synchronized audio and video data according to the reduced start-up timer. In addition, the techniques include configuring the processing pipeline in the sink device prior to receiving the media data from the source device based on stream header information exchanged during a capability negotiation period of the communication session in order to reduce latency due to set up time.

In one example, this disclosure is directed to a method comprising establishing a communication session at a sink device with a source device in a WD system, receiving, with the sink device, media data from the source device, wherein the media data includes at least video data, decoding the received media data with a processing pipeline of the sink device, detecting whether the decoded media data includes audio data, and, when the decoded media data does not include audio data, performing accelerated rendering of the video data with the processing pipeline of the sink device.

In another example, this disclosure is directed to a sink device comprising a processing pipeline including one or more processing units configured to establish a communication session at the sink device with a source device in a WD system, receive media data from the source device, wherein the media data includes at least video data, decode the received media data, detect whether the received media data includes audio data, and, when the received media data does not include audio data, perform accelerated rendering of the video data, and a pipeline manager configured to manage the processing pipeline of the sink device.

In a further example, this disclosure is directed to a sink device comprising means for establishing a communication session at the sink device with a source device in a WD system, means for receiving media data from the source device, wherein the media data includes at least video data, means for decoding the received media data with a processing pipeline of the sink device, means for detecting whether the received media data includes audio data, and, when the received media data does not include audio data, means for performing accelerated rendering of the video data with the processing pipeline of the sink device.

In another example, this disclosure is directed to a computer-readable medium comprising instructions that when executed in a sink device cause a programmable processor to establish a communication session at the sink device with a source device in a WD system, receive media data from the source device, wherein the media data includes at least video data, decode the received media data with a processing pipeline of the sink device, detect whether the received media data includes audio data, and, when the received media data does not include audio data, perform accelerated rendering of the video data with the processing pipeline of the sink device.

The details of one or more examples of the disclosure are set forth in the accompanying drawings and the description below. Other features, objects, and advantages will be apparent from the description and drawings, and from the claims.

DETAILED DESCRIPTION

Figure 1:
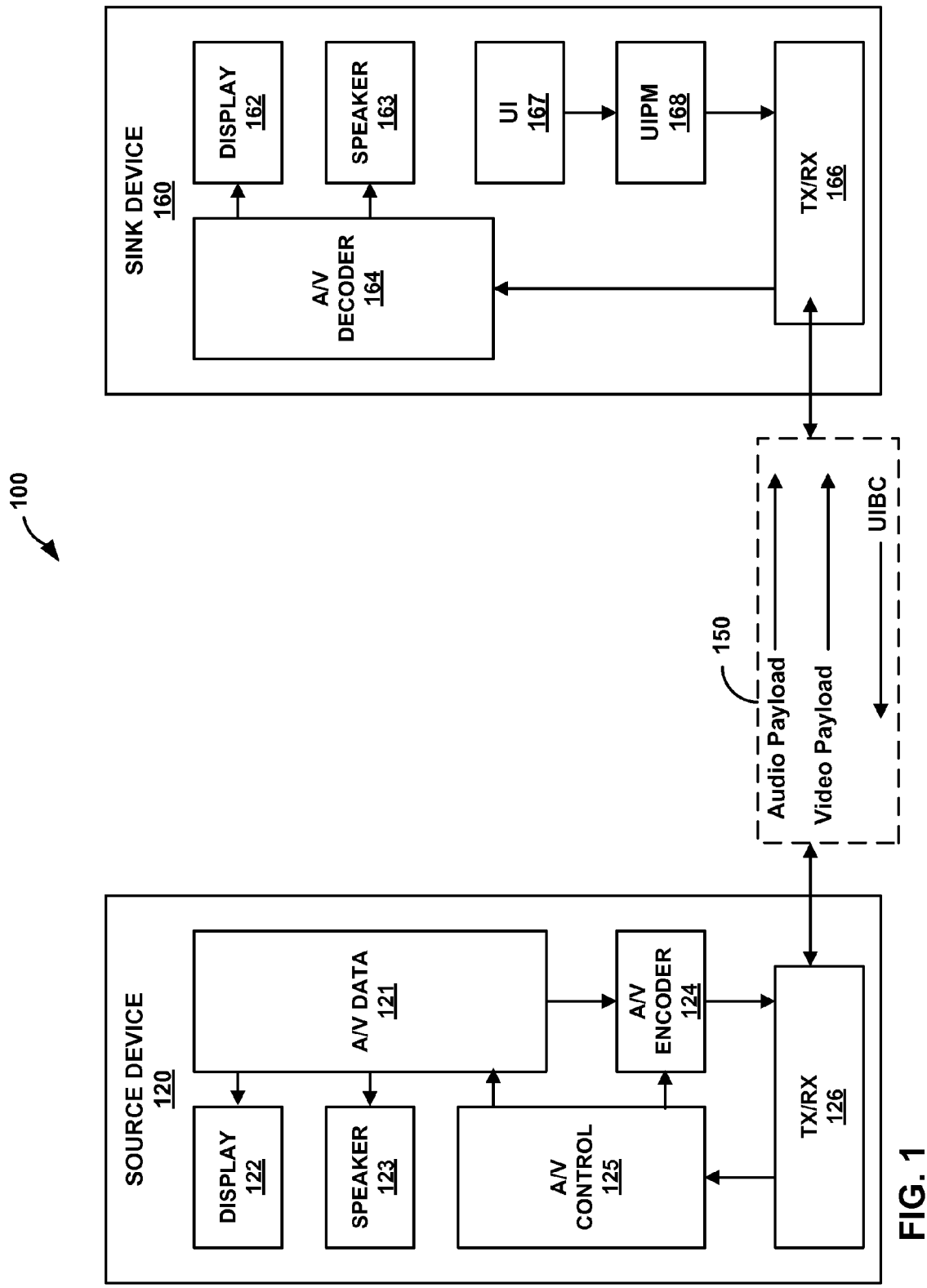
FIG. 1 is a block diagram illustrating an example of a Wireless Display (WD) system including a source device and a sink device capable of supporting techniques of this disclosure to reduce end-to-end latency between the source device and the sink device while improving video playback quality.

Techniques are described in this disclosure for improving a user experience in a Wireless Display (WD) system. The WD system includes a source device that provides media data, e.g., audio and/or video data, to one or more sink devices for playback. The techniques are directed toward reducing end-to-end latency of the media data between the source device and the sink devices while improving video playback quality (i.e., smoothness) at the sink devices.

In one example, the techniques include low latency screen capture and buffering at the source device of the WD system. For example, upon establishing a communication session in the WD system, a pipeline manager may configure a processing pipeline of the source device to include minimum-size buffers between processing steps to reduce latency. The source device then buffers at least a most recent frame update of the media data in the minimum-size buffers, and drops older frame updates when the minimum-size buffers are full. In addition, the processing pipeline may be configured to use hardware acceleration to retrieve the frame updates from the buffers for processing with the pipeline processing of the source device. Using hardware acceleration may reduce the processing load on a central processing unit (CPU) of the source device to increase frame rate and reduce latency. The source device may also retransmit encoded frame updates (i.e., perform duplicated push) to ensure timely receipt by the sink devices to further reduce latency in the WD system.

In another example, the techniques include customized playback at the sink devices of the WD system based on the type of media data received from the source device. If the media data only includes video data and does not include audio data, a renderer included in a processing pipeline of the sink device is configured to perform accelerated rendering of the video data. For example, upon detecting that the media data does not include audio data, a pipeline manager may disable synchronization at the renderer included in the processing pipeline of the sink device to enable the renderer to render the video data without waiting to synchronize with non-existent audio data. As another example, upon detecting that the media data includes both video data and audio data, the pipeline manager may reduce an audio rendering start-up timer so the renderer can render the synchronized audio and video data according to the reduced start-up timer. In addition, the pipeline manager may configure the processing pipeline in the sink device prior to receiving the media data from the source device based on stream header information exchanged during a capability negotiation period of the communication session in order to reduce latency due to set up time.

In a further example, the techniques include customized buffering at the sink devices of the WD system based on application awareness for the media data received from the source device. The sink device learns the type of application for the media data, and a pipeline manager adjusts the size of buffers in the processing pipeline of the sink device to achieve an appropriate balance between smoothness and latency for the application type. In some cases, the type of application for the media data may be detected at the source device, and the sink device may learn the type of application based on an indication received form the source device. In other cases, the sink device may learn the type of application for the media data by detecting the type of application itself. For example, when the media data is for a video playback application, in which quality or smoothness of the playback is highest priority at the sink device and the low latency techniques described above may cause visible jitter, the buffer size is increased to increase smoothness of the media data in the video playback application. On the contrary, when the media data is for a user interface (UI) application or a gaming application, in which low latency is the highest priority at the sink device, the buffer size is decreased to reduce latency for the UI or gaming application.

The techniques also include prioritizing transport of audio data over transport of video data between the source device and the sink devices in the WD system. The transport of video data packets is tied to the transport of associated audio data packets such that ensuring that all the audio packets reach the sink device reduces latency at the sink device waiting to receive dropped packets. A pipeline manager may configure an audio pipeline path to include more buffering than a video pipeline path in the source device. In addition, a wireless modem socket at the source device may provide a higher priority transportation queue for the audio pipeline path than for the video pipeline path. The additional buffering ensures that fewer audio packets will be dropped at the source device. The higher priority transportation queue ensures that the audio packets will be queued for transport at the source device before the corresponding video packets to avoid delays or stalls in the video pipeline path. In addition, the sink device may provide feedback information to the source device describing transport conditions of the communication channel, and the pipeline manager may modify the processing pipeline of the source device based on the feedback information.

FIG. 1 is a block diagram illustrating an example of a Wireless Display (WD) system 100 including a source device 120 and a sink device 160 capable of supporting techniques of this disclosure to reduce end-to-end latency between source device 120 and sink device 160 while improving video playback quality. As shown in FIG. 1, WD system 100 includes source device 120 that communicates with sink device 160 via communication channel 150.

Source device 120 may include a memory that stores audio and/or video (A/V) media data 121, display 122, speaker 123, audio and/or video (A/V) encoder 124 (also referred to as encoder 124), audio and/or video (A/V) control module 125, and transmitter/receiver (TX/RX) unit 126. Sink device 160 may include display 162, speaker 163, audio and/or video (A/V) decoder 164 (also referred to as decoder 164), transmitter/receiver unit 166, user input (UI) device 167, and user input processing module (UIPM) 168. The illustrated components constitute merely one example configuration for WD system 100. Other configurations may include fewer components than those illustrated or may include additional components than those illustrated.

In the example of FIG. 1, source device 120 can display the video portion of A/V media data 121 on display 122 and can output the audio portion of A/V media data 121 on speaker 123. A/V media data 121 may be stored locally on source device 120, accessed from an external storage medium such as a file server, hard drive, external memory, Blu-ray disc, DVD, or other physical storage medium, or may be streamed to source device 120 via a network connection such as the internet. In some instances A/V media data 121 may be captured in real-time via a camera and microphone of source device 120. A/V media data 121 may include multimedia content such as movies, television shows, or music, but may also include real-time content generated by source device 120. Such real-time content may for example be produced by applications running on source device 120, or video data captured, e.g., as part of a video telephony session. Such real-time content may in some instances include a video frame of user input options available for a user to select. In some instances, A/V media data 121 may include video frames that are a combination of different types of content, such as a video frame of a movie or TV program that has user input options overlaid on the frame of video.

In addition to rendering A/V media data 121 locally via display 122 and speaker 123, A/V encoder 124 of source device 120 can encode A/V media data 121, and transmitter/receiver unit 126 can transmit the encoded data over communication channel 150 to sink device 160. Transmitter/receiver unit 166 of sink device 160 receives the encoded data, and A/V decoder 164 decodes the encoded data and outputs the decoded data via display 162 and speaker 163. In this manner, the audio and video data being rendered by display 122 and speaker 123 can be simultaneously rendered by display 162 and speaker 163. The audio data and video data may be arranged in frames, and the audio frames may be time-synchronized with the video frames when rendered.

A/V encoder 124 and A/V decoder 164 may implement any number of audio and video compression standards, such as the ITU-T H.264 standard, alternatively referred to as MPEG-4, Part 10, Advanced Video Coding (AVC), or the newly emerging high efficiency video coding (HEVC) standard. Many other types of proprietary or standardized compression techniques may also be used. Generally speaking, A/V decoder 164 is configured to perform the reciprocal coding operations of A/V encoder 124. Although not shown in FIG. 1, in some aspects, A/V encoder 124 and A/V decoder 164 may each be integrated with an audio encoder and decoder, and may include appropriate MUX-DEMUX units, or other hardware and software, to handle encoding of both audio and video in a common data stream or separate data streams.

A/V encoder 124 may also perform other encoding functions in addition to implementing a video compression standard as described above. For example, A/V encoder 124 may add various types of metadata to A/V media data 121 prior to A/V media data 121 being transmitted to sink device 160. In some instances, A/V media data 121 may be stored on or received at source device 120 in an encoded form and thus not require further compression by A/V encoder 124.

Although, FIG. 1 shows communication channel 150 carrying audio payload data and video payload data separately, it is to be understood that in some instances video payload data and audio payload data may be part of a common data stream. If applicable, MUX-DEMUX units may conform to the ITU H.223 multiplexer protocol, or other protocols such as the user datagram protocol (UDP). A/V encoder 124 and A/V decoder 164 each may be implemented as one or more microprocessors, digital signal processors (DSPs), application specific integrated circuits (ASICs), field programmable gate arrays (FPGAs), discrete logic, software, hardware, firmware or any combinations thereof. Each of A/V encoder 124 and A/V decoder 164 may be included in one or more encoders or decoders, either of which may be integrated as part of a combined encoder/decoder (CODEC). Thus, each of source device 120 and sink device 160 may comprise specialized machines configured to execute one or more of the techniques of this disclosure.

Display 122 and display 162 may comprise any of a variety of video output devices such as a cathode ray tube (CRT), a liquid crystal display (LCD), a plasma display, a light emitting diode (LED) display, an organic light emitting diode (OLED) display, or another type of display device. In these or other examples, the displays 122 and 162 may each be emissive displays or transmissive displays. Display 122 and display 162 may also be touch displays such that they are simultaneously both input devices and display devices. Such touch displays may be capacitive, resistive, or other type of touch panel that allows a user to provide user input to the respective device.

Speaker 123 may comprise any of a variety of audio output devices such as headphones, a single-speaker system, a multi-speaker system, or a surround sound system. Additionally, although display 122 and speaker 123 are shown as part of source device 120 and display 162 and speaker 163 are shown as part of sink device 160, source device 120 and sink device 160 may in fact be a system of devices. As one example, display 162 may be a television, speaker 163 may be a surround sound system, and decoder 164 may be part of an external box connected, either wired or wirelessly, to display 162 and speaker 163. In other instances, sink device 160 may be a single device, such as a tablet computer or smartphone. In still other cases, source device 120 and sink device 160 are similar devices, e.g., both being smartphones, tablet computers, or the like. In this case, one device may operate as the source and the other may operate as the sink. These rolls may even be reversed in subsequent communication sessions. In still other cases, the source device may comprise a mobile device, such as a smartphone, laptop or tablet computer, and the sink device may comprise a more stationary device (e.g., with an AC power cord), in which case the source device may deliver audio and video data for presentation to a large crowd via the sink device.

Transmitter/receiver unit 126 and transmitter/receiver unit 166 may each include various mixers, filters, amplifiers and other components designed for signal modulation, as well as one or more antennas and other components designed for transmitting and receiving data. Communication channel 150 generally represents any suitable communication medium, or collection of different communication media, for transmitting video data from source device 120 to sink device 160. Communication channel 150 is usually a relatively short-range communication channel, similar to Wi-Fi, Bluetooth, or the like. However, communication channel 150 is not necessarily limited in this respect, and may comprise any wireless or wired communication medium, such as a radio frequency (RF) spectrum or one or more physical transmission lines, or any combination of wireless and wired media. In other examples, communication channel 150 may even form part of a packet-based network, such as a wired or wireless local area network, a wide-area network, or a global network such as the Internet. Additionally, communication channel 150 may be used by source device 120 and sink device 160 to create a peer-to-peer link.

Source device 120 and sink device 160 may establish a communication session according to a capability negotiation using, for example, Real-Time Streaming Protocol (RTSP) control messages. Source device 120 and sink device 160 may then communicate over communication channel 150 using a communications protocol such as a standard from the IEEE 802.11 family of standards. Source device 120 and sink device 160 may, for example, communicate according to the Wi-Fi Direct (WFD) standard, such that source device 120 and sink device 160 communicate directly with one another without the use of an intermediary such as wireless access points or so called hotspots. Source device 120 and sink device 160 may also establish a tunneled direct link setup (TDLS) to avoid or reduce network congestion. WFD and TDLS are intended to setup relatively short-distance communication sessions. Relatively short distance in this context may refer to, for example, less than approximately 70 meters, although in a noisy or obstructed environment the distance between devices may be even shorter, such as less than approximately 35 meters, or less than approximately 20 meters.

The techniques of this disclosure may at times be described with respect to WFD, but it is contemplated that aspects of these techniques may also be compatible with other communication protocols. By way of example and not limitation, the wireless communication between source device 120 and sink device may utilize orthogonal frequency division multiplexing (OFDM) techniques. A wide variety of other wireless communication techniques may also be used, including but not limited to time division multi access (TDMA), frequency division multi access (FDMA), code division multi access (CDMA), or any combination of OFDM, FDMA, TDMA and/or CDMA.

In addition to decoding and rendering data received from source device 120, sink device 160 can also receive user inputs from user input device 167. User input device 167 may, for example, be a keyboard, mouse, trackball or track pad, touch screen, voice command recognition module, or any other such user input device. UIPM 168 formats user input commands received by user input device 167 into a data packet structure that source device 120 is capable of interpreting. Such data packets are transmitted by transmitter/receiver 166 to source device 120 over communication channel 150. Transmitter/receiver unit 126 receives the data packets, and A/V control module 125 parses the data packets to interpret the user input command that was received by user input device 167. Based on the command received in the data packet, A/V control module 125 can change the content being encoded and transmitted. In this manner, a user of sink device 160 can control the audio payload data and video payload data being transmitted by source device 120 remotely and without directly interacting with source device 120.

Additionally, users of sink device 160 may be able to launch and control applications on source device 120. For example, a user of sink device 160 may able to launch a photo editing application stored on source device 120 and use the application to edit a photo that is stored locally on source device 120. Sink device 160 may present a user with a user experience that looks and feels like the photo is being edited locally on sink device 160 while in fact the photo is being edited on source device 120. Using such a configuration, a device user may be able to leverage the capabilities of one device for use with several devices. For example, source device 120 may comprise a smartphone with a large amount of memory and high-end processing capabilities. When watching a movie, however, the user may wish to watch the movie on a device with a bigger display screen, in which case sink device 160 may be a tablet computer or even larger display device or television. When wanting to send or respond to email, the user may wish to use a device with a physical keyboard, in which case sink device 160 may be a laptop. In both instances, the bulk of the processing may still be performed by source device 120 even though the user is interacting with a sink device. The source device and the sink device may facilitate two way interactions by negotiating and/or identifying the capabilities of the devices in any given session.

In some configurations, A/V control module 125 may comprise an operating system process that is executed by the operating system of source device 120. In other configurations, however, A/V control module 125 may comprise a software process of an application running on source device 120. In such a configuration, the user input command may be interpreted by the software process, such that a user of sink device 160 is interacting directly with the application running on source device 120, as opposed to the operating system running on source device 120. By interacting directly with an application as opposed to an operating system, a user of sink device 160 may have access to a library of commands that are not native to the operating system of source device 120. Additionally, interacting directly with an application may enable commands to be more easily transmitted and processed by devices running on different platforms.

User inputs applied at sink device 160 may be sent back to source device 120 over communication channel 150. In one example, a reverse channel architecture, also referred to as a user interface back channel (UIBC) may be implemented to enable sink device 160 to transmit the user inputs applied at sink device 160 to source device 120. The reverse channel architecture may include upper layer messages for transporting user inputs, and lower layer frames for negotiating user interface capabilities at sink device 160 and source device 120. The UIBC may reside over the Internet Protocol (IP) transport layer between sink device 160 and source device 120. In this manner, the UIBC may be above the transport layer in the Open System Interconnection (OSI) communication model. To promote reliable transmission and in sequence delivery of data packets containing user input data, UIBC may be configured to run on top of other packet-based communication protocols such as the transmission control protocol/internet protocol (TCP/IP) or the user datagram protocol (UDP). UDP and TCP can operate in parallel in the OSI layer architecture. TCP/IP can enable sink device 160 and source device 120 to implement retransmission techniques in the event of packet loss.

The UIBC may be designed to transport various types of user input data, including cross-platform user input data. For example, source device 120 may run the iOS® operating system, while sink device 160 runs another operating system such as Android® or Windows®. Regardless of platform, UIPM 168 can encapsulate received user input in a form understandable to A/V control module 125. A number of different types of user input formats may be supported by the UIBC so as to allow many different types of source and sink devices to exploit the protocol regardless of whether the source and sink devices operate on different platforms. Generic input formats may be defined, and platform specific input formats may both be supported, thus providing flexibility in the manner in which user input can be communicated between source device 120 and sink device 160 by the UIBC.

The techniques of this disclosure may improve a user experience in WD system 100. Typical use-cases for users of WD system 100 include displaying user interface applications running on source device 120 on a larger display screen of sink device 160 with reverse human interface device (HID) feedback, displaying gaming applications running on source device 120 at sink device 160, and displaying video playback applications running on source device 120 at sink device 160. For each of these use-cases, source device 120 may transmit the contents of an entire frame buffers and frame updates end-to-end to sink device 160 for display to a user of sink device 160. Transmitter/receiver 126 of source device 120 may transport the encoded video frames to transmitter/receiver 166 of source device 160 using the Real-time Transport Protocol (RTP)/User Datagram Protocol (UDP) or the Transmission Control Protocol (TCP).

In order for WD system 100 to provide a similar user experience as High Definition Multimedia Interface (HDMI) or other types of display cables, WD system 100 needs to achieve end-to-end latency of less than approximately 80 milliseconds (ms). In the case of the video playback application use-case, however, WD system 100 also needs to achieve high quality (i.e., smoothness) in the video playback at sink device 160 without introducing too much additional latency. This disclosure describes several techniques that may be applied individually or in combination to WD system 100 to achieve the latency and quality needs described above for an improved user experience.

According to the techniques of this disclosure, processing pipelines may be configured in both source device 120 and sink device 160 to reduce end-to-end latency of A/V media data 121 transmitted between source device 120 and sink device 160 while improving video playback quality at sink device 160. In one example, the techniques include low latency screen capture and buffering at source device 120. For example, upon establishing a communication session in WD system 100, a pipeline manager may configure a processing pipeline of source device 120 to include minimum-size buffers capable of holding at least a most recent frame update of A/V media data 121 between processing steps to reduce latency. In addition, the processing pipeline of source device 120 may be configured to use hardware acceleration to retrieve the frame updates from the buffers for processing with the pipeline processing.

In another example, the techniques include customized playback at sink device 160 based on the type of A/V media data 121 received from source device 120. If A/V media data 121 only includes video data and does not include audio data, a renderer included in a processing pipeline of sink device 160 may be configured to perform accelerated rendering of the video data. If A/V media data 121 includes both video data and audio data, a pipeline manager may reduce an audio rendering start-up timer so the renderer can render the synchronized audio and video data according to the reduced start-up timer. In addition, the pipeline manager may configure the processing pipeline in sink device 160 prior to receiving A/V media data 121 from source device 120 based on stream header information exchanged during a capability negotiation period of the communication session in order to reduce latency due to set up time.

In a further example, the techniques include customized buffering at sink device 160 based on application awareness for A/V media data 121 received from source device 120. Sink device 160 learns the type of application for A/V media data 121, and a pipeline manager adjusts the size of buffers in the processing pipeline of sink device 160 to achieve an appropriate balance between smoothness and latency for the application type. For example, when A/V media data 121 is for a video playback application, the buffer size is increased to increase smoothness for the video playback application. On the contrary, when A/V media data 121 is for a user interface (UI) application or a gaming application, the buffer size is decreased to reduce latency for the UI or gaming application.

The techniques of this disclosure may also include prioritizing transport of audio data over transport of video data between source device 120 and sink device 160. The transport of video data packets is tied to the transport of associated audio data packets such that ensuring that all the audio packets reach the sink device reduces latency at the sink device waiting to receive dropped packets. A pipeline manager may configure an audio pipeline path to include more buffering than a video pipeline path in source device 120. In addition, a wireless modem socket at source device 120 may provide a higher priority transportation queue for the audio pipeline path than for the video pipeline path. In addition, sink device 160 may provide feedback information to source device 120 describing transport conditions of communication channel 150 over the UIBC, and the pipeline manager may modify the processing pipeline of source device 120 based on the feedback information.

In the example of FIG. 1, source device 120 may comprise a smartphone, tablet computer, laptop computer, desktop computer, Wi-Fi enabled television, or any other device capable of transmitting audio and video data. Sink device 160 may likewise comprise a smartphone, tablet computer, laptop computer, desktop computer, Wi-Fi enabled television, or any other device capable of receiving audio and video data and receiving user input data. In some instances, sink device 160 may include a system of devices, such that display 162, speaker 163, UI device 167, and A/V encoder 164 all parts of separate but interoperative devices. Source device 120 may likewise be a system of devices rather than a single device.

In this disclosure, the term source device is generally used to refer to the device that is transmitting A/V data, and the term sink device is generally used to refer to the device that is receiving the A/V data from the source device. In many cases, source device 120 and sink device 160 may be similar or identical devices, with one device operating as the source and the other operating as the sink. Moreover, these rolls may be reversed in different communication sessions. Thus, a sink device in one communication session may become a source device in a subsequent communication session, or vice versa.

In some examples, WD system 100 may include one or more sink devices in addition to sink device 160. Similar to sink device 160, the additional sink devices may receive A/V data from source device 120 and transmit user commands to source device 120 over an established UIBC. In some configurations, the multiple sink devices may operate independently of one another, and A/V data output at source device 120 may be simultaneously output at sink device 160 and one or more of the additional sink devices. In alternate configurations, sink device 160 may be a primary sink device and one or more of the additional sink devices may be secondary sink devices. In such an example configuration, sink device 160 and one of the additional sink devices may be coupled, and sink device 160 may display video data while the additional sink device outputs corresponding audio data. Additionally, in some configurations, sink device 160 may output transmitted video data only while the additional sink device outputs transmitted audio data.

Figure 2:
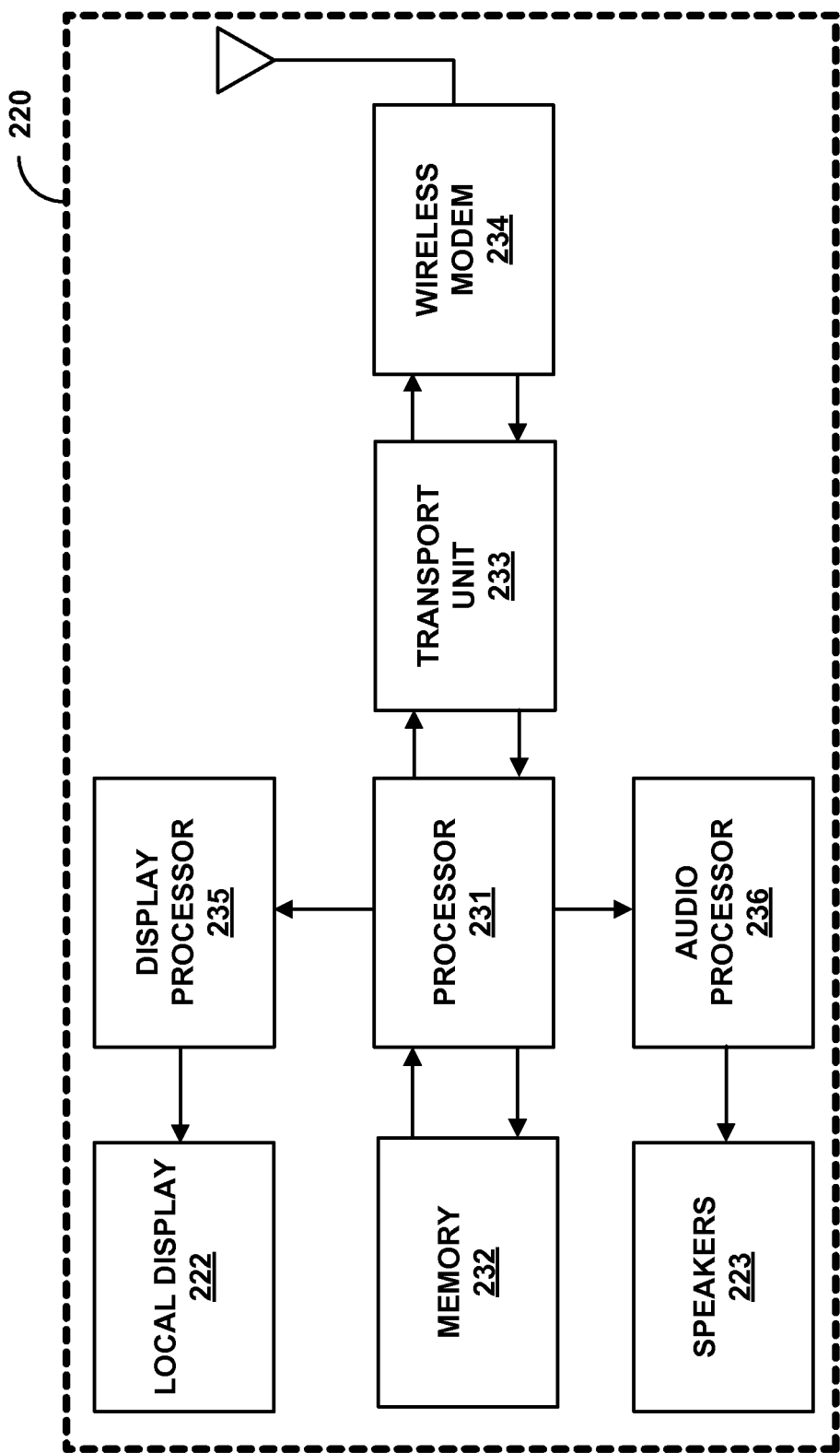
FIG. 2 is a block diagram illustrating an example of a source device in a WD system that may implement techniques of this disclosure.

FIG. 2 is a block diagram illustrating an example of a source device 220 in a WD system that may implement techniques of this disclosure. Source device 220 may be a device similar to source device 120 in FIG. 1 and may operate in the same manner as source device 120. Source device 220 includes local display 222, speakers 223, processor 231, display processor 235, audio processor 236, memory 232, transport unit 233, and wireless modem 234. As shown in FIG. 2, source device 220 may include one or more processors (i.e. processor 231, display processor 235 and audio processor 236) that encode and/or decode A/V media data for transport, storage, and display. The A/V media data may for example be stored at memory 232. Memory 232 may store an entire A/V file, or may comprise a smaller buffer that simply stores a portion of an A/V file, e.g., streamed from another device or source.

Transport unit 233 may process encoded A/V media data for network transport. For example, encoded A/V media data may be processed by processor 231 and encapsulated by transport unit 233 into Network Access Layer (NAL) units for communication across a network. The NAL units may be sent by wireless modem 234 to a wireless sink device via a network connection. Wireless modem 234 may, for example, be a Wi-Fi modem configured to implement one of the IEEE 802.11 family of standards. Source device 220 may also locally process and display A/V media data. In particular, display processor 235 may process video data to be displayed on local display 222, and audio processor 236 may process audio data for output on speaker 223.

As described above with reference to source device 120 of FIG. 1, source device 220 may receive user input commands from a sink device. For example, wireless modem 234 of source device 220 may receive encapsulated user input data packets, such as NAL units, from a sink device and send the encapsulated data units to transport unit 233 for decapsulation. Transport unit 233 may extract the user input data packets from the NAL units, and processor 231 may parse the data packets to extract the user input commands. Based on the user input commands, processor 231 modifies the processing of A/V media data by source device 220. In other examples, source device 220 may include a user input unit or driver (not shown in FIG. 2) that receives the user input data packets from transport unit 233, parses the data packets to extract the user input commands, and directs processor 231 to modify processing of A/V media data by source device 220 based on the user input commands.

Processor 231 of FIG. 2 generally represents any of a wide variety of processors, including but not limited to one or more digital signal processors (DSPs), general purpose microprocessors, application specific integrated circuits (ASICs), field programmable logic arrays (FPGAs), other equivalent integrated or discrete logic circuitry, or some combination thereof. Memory 232 of FIG. 2 may comprise any of a wide variety of volatile or non-volatile memory, including but not limited to random access memory (RAM) such as synchronous dynamic random access memory (SDRAM), read-only memory (ROM), non-volatile random access memory (NVRAM), electrically erasable programmable read-only memory (EEPROM), FLASH memory, and the like. Memory 232 may comprise a computer-readable storage medium for storing audio/video data, as well as other kinds of data. Memory 232 may additionally store instructions and program code that are executed by processor 231 as part of performing the various techniques described in this disclosure.

The techniques of this disclosure include configuring a processing pipeline of source device 220 to reduce latency in order to improve a user experience at source device 220 and at one or more sink devices in the WD system. The processing pipeline of source device 220 includes a one or more processing units executed by processor 231 and/or transport unit 233. The techniques are described in further detail with respect to a processing pipeline of source device 520 illustrated in FIG. 5.

In one example, the processing pipeline of source device 220 may be modified to provide low latency screen capture and buffering of media data. More specifically, the processing pipeline of source device 220 may be configured to include minimum-size buffers between processing steps within processor 231 to reduce latency. Source device 220 then buffers at least a most recent frame update of the media data in the minimum-size buffers, and drops older frame updates when the minimum-size buffers are full.

The processing pipeline of source device 220 may also be configured to use hardware acceleration to retrieve the frame updates from the buffers for processing. Using hardware acceleration may reduce the processing load on a central processing unit (CPU) of source device 220, which will increase frame rate and reduce latency in the WD system. Source device 220 may also retransmit encoded frame updates (i.e., perform duplicated push) to ensure timely receipt by the sink devices to further reduce latency in the WD system.

As another example, according to the techniques, the processing pipeline of source device 220 may be configured to prioritize transport of audio data over transport of video data between source device 220 and the sink devices in the WD system. The transport of video data packets is tied to the transport of associated audio data packets such that ensuring that all the audio packets reach the sink devices reduces latency at the sink devices waiting to receive dropped packets.

More specifically, an audio pipeline path of source device 220 may be configured to include more buffering than a video pipeline path. The additional buffering ensures that fewer audio packets will be dropped at source device 220. As another example, the processing pipeline of source device 220 may be configured to provide a higher priority transportation queue at wireless modem 234 for the audio pipeline path than for the video pipeline path. The higher priority transportation queue ensures that the audio packets will be queued for transport at source device 220 before the corresponding video packets to avoid delays or stalls in the video pipeline path caused by video packets waiting for corresponding audio packets. In addition, wireless modem 234 of source device 220 may receive feedback information from the sink devices in the WD system describing transport conditions of the communication channel. In response, source device 220 may modify the processing pipeline based on the feedback information.

Applying one or more of the techniques described above to source device 220 may reduce end-to-end latency in a WD system and improve the user experience at both source device 220 and the sink devices in the WD system.

Figure 3:
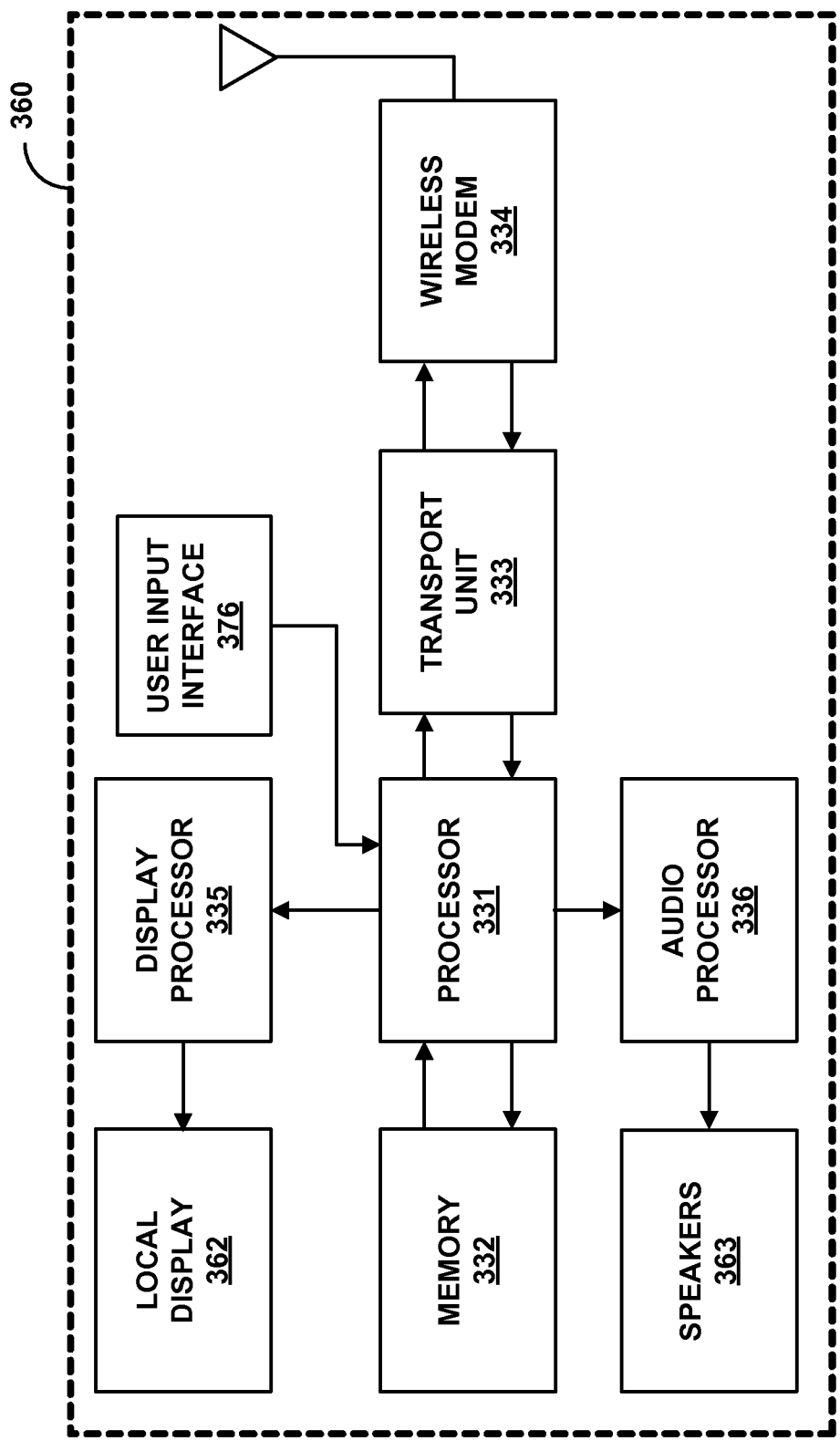
FIG. 3 is a block diagram illustrating an example of a sink device in a WD system that may implement techniques of this disclosure.

FIG. 3 is a block diagram illustrating an example of a sink device 360 in a WD system that may implement techniques of this disclosure. Sink device 360 may be a device similar to sink device 160 in FIG. 1 and may operate in the same manner as sink device 160. Sink device 360 includes processor 331, memory 332, transport unit 333, wireless modem 334, display processor 335, local display 362, audio processor 336, speaker 363, and user input interface 376.

Sink device 360 receives at wireless modem 334 encapsulated data units sent from a source device. Wireless modem 334 may, for example, be a Wi-Fi modem configured to implement one or more standards from the IEEE 802.11 family of standards. Transport unit 333 can decapsulate the encapsulated data units. For instance, transport unit 333 may extract encoded video data from the encapsulated data units and send the encoded A/V data to processor 331 to be decoded and rendered for output. Display processor 335 may process decoded video data to be displayed on local display 362, and audio processor 336 may process decoded audio data for output on speaker 363.

In addition to rendering audio and video data, wireless sink device 360 may also receive user input data through user input interface 376. User input interface 376 can represent any of a number of user input devices included but not limited to a touch display interface, a keyboard, a mouse, a voice command module, gesture capture device (e.g., with camera-based input capturing capabilities) or any other of a number of user input devices. User input received through user input interface 376 can be processed by processor 331. This processing may include generating data packets that include the received user input command. Once generated, transport unit 333 may process the data packets for network transport to a source device over a UIBC.

Processor 331 of FIG. 3 may comprise one or more of a wide range of processors, such as one or more digital signal processors (DSPs), general purpose microprocessors, application specific integrated circuits (ASICs), field programmable logic arrays (FPGAs), other equivalent integrated or discrete logic circuitry, or some combination thereof. Memory 332 of FIG. 3 may comprise any of a wide variety of volatile or non-volatile memory, including but not limited to random access memory (RAM) such as synchronous dynamic random access memory (SDRAM), read-only memory (ROM), non-volatile random access memory (NVRAM), electrically erasable programmable read-only memory (EEPROM), FLASH memory, and the like. Memory 332 may comprise a computer-readable storage medium for storing audio/video data, as well as other kinds of data. Memory 332 may additionally store instructions and program code that are executed by processor 331 as part of performing the various techniques described in this disclosure.

The techniques of this disclosure include configuring a processing pipeline of sink device 360 to reduce latency and improve video playback quality (i.e., smoothness) in order to improve a user experience at sink device 360. The processing pipeline of sink device 360 includes a one or more processing units executed by processor 331 and/or transport unit 333. The techniques are described in further detail with respect to a processing pipeline of sink device 660 illustrated in FIG. 6.

In one example, the processing pipeline of sink device 360 may be configured to provide customized playback of media data at sink device 360 based on the type of media data received from the source device in the WD system. More specifically, if the media data only includes video data and does not include audio data, the processing pipeline of sink device 360 may be configured to perform accelerated rendering of the video data. Upon detecting that the media data does not include audio data, for example, sink device 360 may disable synchronization and render the video data without waiting to synchronize with non-existent audio data. On the other hand, upon detecting that the media data includes both video data and audio data, sink device 360 may reduce an audio rendering start-up timer and render the synchronized audio and video data according to the reduced start-up timer.

In addition, the processing pipeline of sink device 360 may be configured prior to receiving the media data from the source device based on stream header information. The stream header information may be exchanged by sink device 360 and the source device during a capability negotiation period of the communication session in the WD system. In this way, the processing pipeline of sink device 360 may begin processing received media data immediately and eliminate or reduce any latency due to set up time of the processing pipeline.

As another example, according to the techniques, the processing pipeline of sink device 360 may be configured to provide customized buffering of media data based on application awareness for the media data received from the source device. More specifically, sink device 360 may learn the type of application for received media data, and adjust the size of buffers in the processing pipeline to achieve an appropriate balance between smoothness and latency for the application type. In some cases, the type of application for the media data may be detected at the source device and signaled with the media data to sink device 360. In that case, sink device 360 learns the type of application for the media data based on the indication received from the source device. In other cases, sink device 360 may learn the type of application for the media data by detecting the type of application itself.

When the media data is for a video playback application, in which quality or smoothness of the playback is highest priority at the sink device and the low latency techniques described above may cause visible jitter, the buffer size in the processing pipeline of sink device 360 is increased to increase smoothness of the media data in the video playback application. On the contrary, when the media data is for a user interface (UI) application or a gaming application, in which low latency is the highest priority at the sink device, the buffer size in the processing pipeline of sink device 360 is decreased to reduce latency for the UI or gaming application.

As a further example, according to the techniques, wireless modem 334 of sink device 360 may transmit feedback information describing transport conditions of the communication channel to the source devices in the WD system. Sink device 360 may determine the transport conditions of the communication channel based on error rates and/or packet losses of previously received media data. Wireless modem 334 may transmit the feedback information over a UIBC or other reverse channel to the source device. In some cases, sink device 360 may use Real-time Transport Control Protocol (RTCP) for feedback streaming. In response, the source device may modify its processing of media data destined for sink device 360 based on the feedback information.

Applying one or more of the techniques described above to sink device 360 may reduce end-to-end latency in a WD system and increase video playback quality to increase the user experience at sink device 360 in the WD system.

Figure 4:
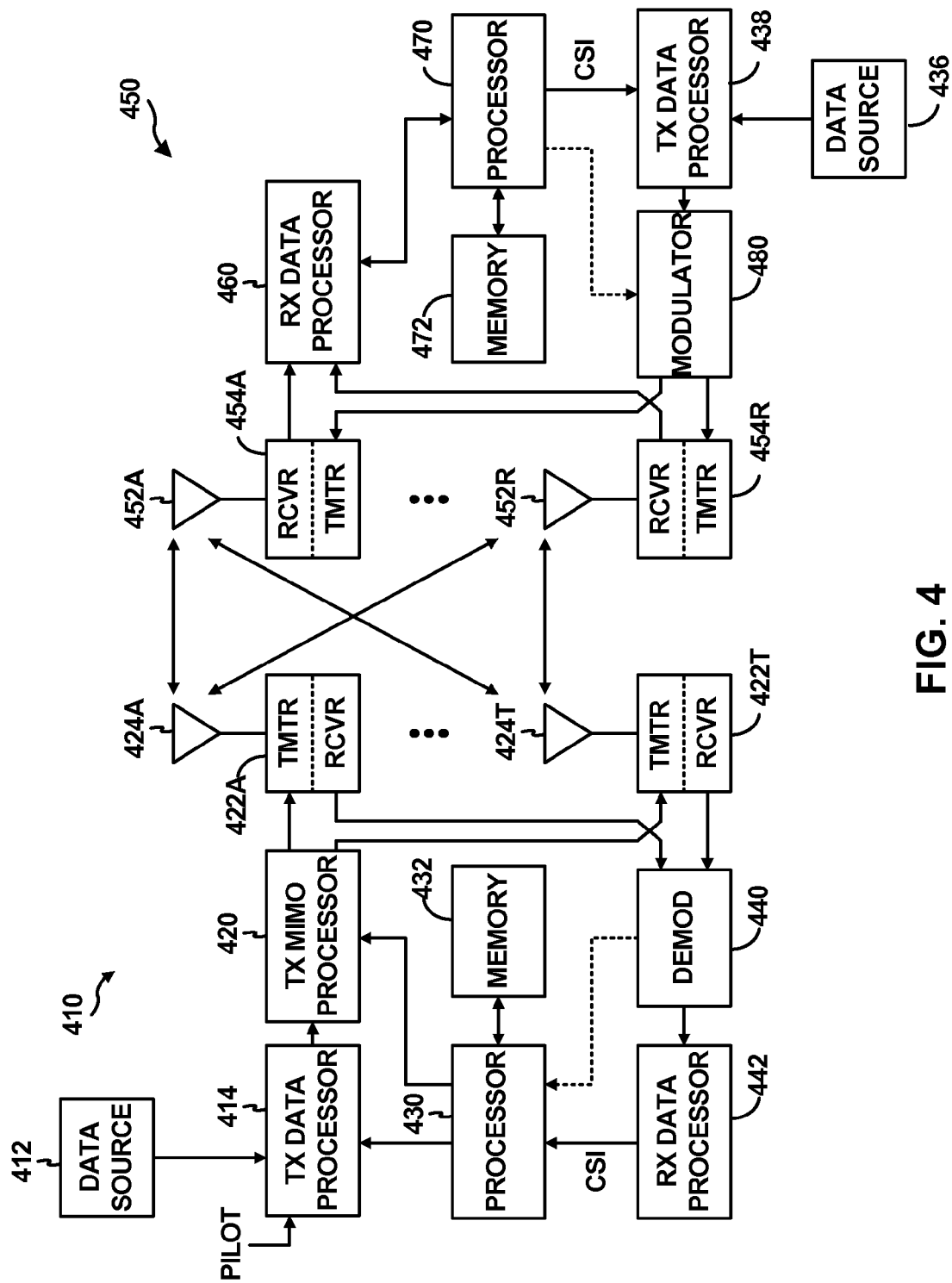
FIG. 4 is a block diagram illustrating a transmitter system and a receiver system that may implement techniques of this disclosure.

FIG. 4 is a block diagram illustrating an example transmitter system 410 and receiver system 450, which may be used by transmitter/receiver 126 and transmitter/receiver 166 of FIG. 1 for communicating over communication channel 150. At transmitter system 410, traffic data for a number of data streams is provided from a data source 412 to a transmit (TX) data processor 414. Each data stream may be transmitted over a respective transmit antenna. TX data processor 414 formats, codes, and interleaves the traffic data for each data stream based on a particular coding scheme selected for that data stream. The coded data for each data stream may be multiplexed with pilot data using orthogonal frequency division multiplexing (OFDM) techniques. A wide variety of other wireless communication techniques may also be used, including but not limited to time division multi access (TDMA), frequency division multi access (FDMA), code division multi access (CDMA), or any combination of OFDM, FDMA, TDMA and/or CDMA.

Consistent with FIG. 4, the pilot data is typically a known data pattern that is processed in a known manner and may be used at receiver system 450 to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK, or M-QAM (Quadrature Amplitude Modulation), where M may be a power of two) selected for that data stream to provide modulation symbols. The data rate, coding, and modulation for each data stream may be determined by instructions performed by processor 430 which may be coupled with memory 432.

The modulation symbols for the data streams are then provided to a TX MIMO processor 420, which may further process the modulation symbols (e.g., for OFDM). TX MIMO processor 420 can then provide $N_T$ modulation symbol streams to $N_T$ transmitters (TMTR) 422A-422T ("transmitters 422"). In certain aspects, TX MIMO processor 420 applies beamforming weights to the symbols of the data streams and to the antenna from which the symbol is being transmitted. Each of transmitters 422 may receive and process a respective symbol stream to provide one or more analog signals, and further condition (e.g., amplify, filter, and upconvert) the analog signals to provide a modulated signal suitable for transmission over the MIMO channel. $N_T$ modulated signals from transmitters 422 are then transmitted from $N_T$ antennas 424A-424T ("antennas 424"), respectively.

At receiver system 450, the transmitted modulated signals are received by $N_R$ antennas 452A-452R ("antennas 452") and the received signal from each of antennas 452 is provided to a respective one of receivers (RCVR) 454A-454R ("receivers 454"). Each of receivers 454 conditions (e.g., filters, amplifies, and downconverts) a respective received signal, digitizes the conditioned signal to provide samples, and further processes the samples to provide a corresponding "received" symbol stream. A receive (RX) data processor 460 then receives and processes the $N_R$ received symbol streams from $N_R$ receivers 454 based on a particular receiver processing technique to provide $N_T$ "detected" symbol streams. The RX data processor 460 then demodulates, deinterleaves and decodes each detected symbol stream to recover the traffic data for the data stream. The processing by RX data processor 460 is complementary to that performed by TX MIMO processor 420 and TX data processor 414 at transmitter system 410.

A processor 470 that may be coupled with a memory 472 periodically determines which pre-coding matrix to use. The reverse link message may comprise various types of information regarding the communication link and/or the received data stream. The reverse link message is then processed by a TX data processor 438, which also receives traffic data for a number of data streams from a data source 436, modulated by a modulator 480, conditioned by transmitters 454, and transmitted back to transmitter system 410.

At transmitter system 410, the modulated signals from receiver system 450 are received by antennas 424, conditioned by receivers 422, demodulated by a demodulator 440, and processed by a RX data processor 442 to extract the reverse link message transmitted by the receiver system 450. Processor 430 then determines which pre-coding matrix to use for determining the beamforming weights and processes the extracted message.

Figure 5:
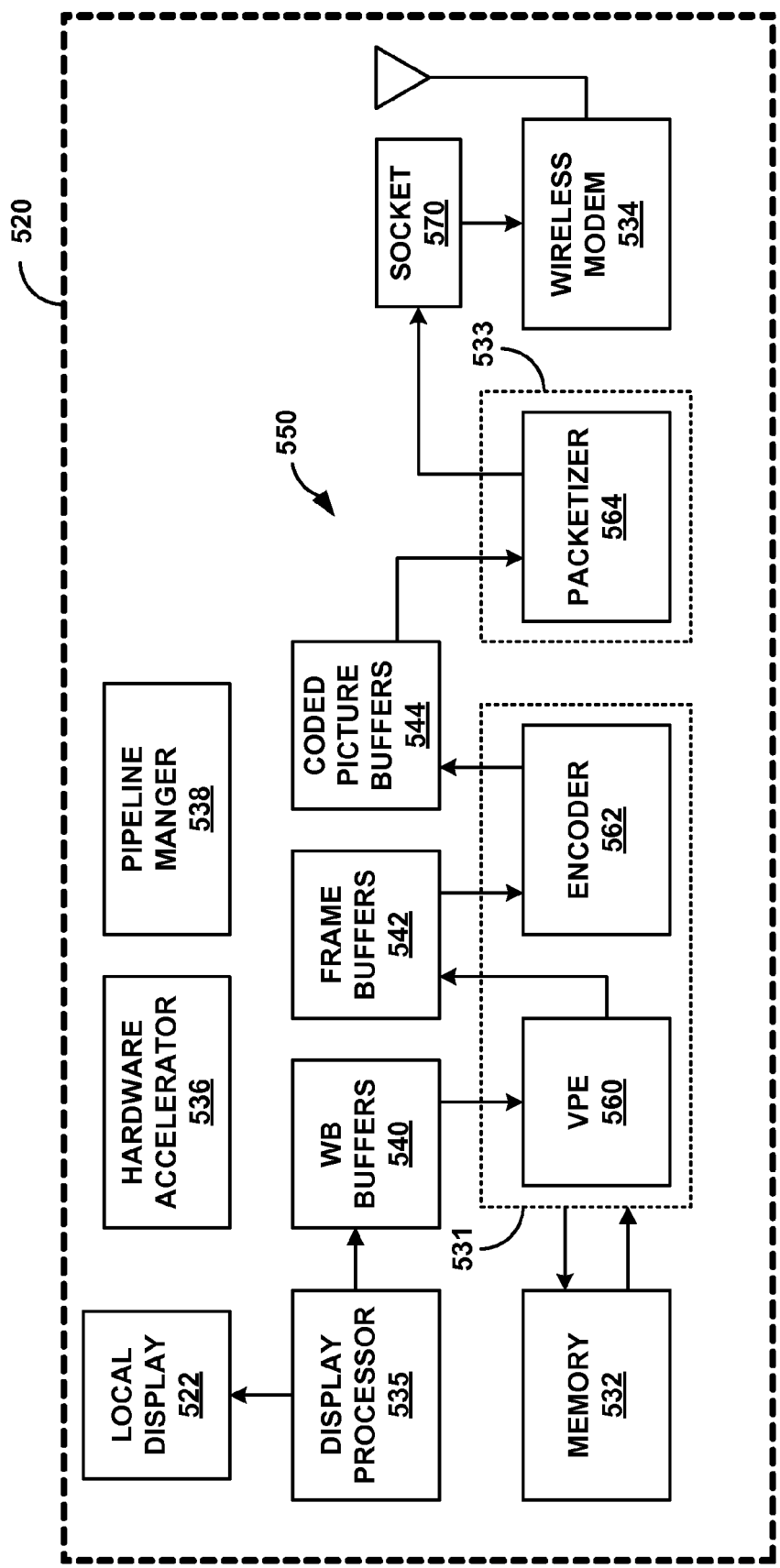
FIG. 5 is a block diagram illustrating an example of a source device capable of supporting techniques of this disclosure to reduce latency in the processing pipeline of the source device.

FIG. 5 is a block diagram illustrating an example of a source device 520 capable of supporting techniques of this disclosure to reduce latency in a processing pipeline 550 of source device 520. Source device 520 may be a device similar to source device 120 from FIG. 1 or source device 220 from FIG. 2, and may operate in the same manner as source device 120 or source device 220.

Source device 520 includes local display 522, display processor 535, memory 532, wireless modem socket 570, wireless modem 534, and processing pipeline 550. Processing pipeline 550 includes buffers and processing units executed by processor 531 and transport unit 533. Specifically, processing pipeline 550 includes a video processing engine (VPE) 560 and an encoder 562 within processor 531, and a packetizer 564 within transport unit 533. In addition, processing pipeline 550 includes write-back (WB) buffers 540 positioned between display processor 535 and VPE 560, frame buffers 542 between VPE 560 and encoder 562, and coded picture buffers (CPBs) 544 between encoder 562 and packetizer 564.

Source device 520 also includes a hardware accelerator 536 and a pipeline manager 538. According to the techniques of this disclosure, pipeline manager 538 configures processing pipeline 550 to provide low latency screen capture and buffering for media data at source device 520. Specifically, pipeline manager 538 configures processing pipeline 550 to include minimum-size buffers and use hardware accelerator 536 to retrieve media data from memory 532 and the minimum-size buffers.

In one example, upon establishing a communication session with one or more sink devices in the WD system, pipeline manager 538 configures processing pipeline 550 of source device 520 to include minimum-size buffers between processing steps to reduce latency. In one case, the minimum-size buffers may include a reduced number of WB buffers 540 for the media data to move through between display processor 535 and VPE 560. For example, pipeline manager 538 may configure processing pipeline 550 to include only two WB buffers 540, e.g., ping-pong buffers, to hold at least a most recent frame update of the media data. The WB buffers 540 may hold the frame updates prior to processing by VPE 560. In addition, the WB buffers 540 may be configured to hold at least the most recent frame update prior to being written back to memory 532. For example, the two WB buffers 540 may be configured to hold less than 32 entries, and in some cases less than 16 entries.

In other cases, the minimum-size buffers may also include a reduced number of frame buffers 542 for the media data to move through between VPE 560 and encoder 562. For example, pipeline manager 538 may configure processing pipeline 550 to include only four frame buffers 542, e.g., two ping-pong buffers and two hold buffers, to hold at least a most recent frame update of the media data. In addition, the minimum-size buffers may include a reduced number of CPBs 544 for the media data to move through between encoder 562 and packetizer 564. For example, pipeline manager 538 may configure processing pipeline 550 to include only six CPBs 544, e.g., two ping-pong buffers and four hold buffers, to hold at least a most recent frame update of the media data.

Using minimum-size buffers in processing pipeline 550 of source device 520, in accordance with the techniques, reduces latency at source device 520 because the frame updates move through fewer and smaller buffers before and during processing. In addition, minimizing the size of WB buffers 540 to only two ping-pong buffers with less than 32 entries allows frame drops to occur at an early stage of processing pipeline 550 of source device 520 rather than choking processing pipeline 550 further downstream.

When processing pipeline 550 of source device 520 is modified to include minimum-size buffers, pipeline manager 538 may also modify the frame capture process within processing pipeline 550 to ensure that the most recent frame update is buffered, processed, and transmitted to the sink devices. The techniques include buffering at least a most recent frame update captured from the media data in the minimum-size buffers, and dropping older frame updates when the minimum-size buffers are full. For example, each frame update (e.g., either partial or whole frame) may be queued or accumulated in WB buffers 540 dedicated for the WD system in source device 520. If minimum-size WB buffers 540 run out of space for additional frame updates, WB buffers 540 may be configured to drop older frame updates and maintain more recent frame updates. The minimum-size WB buffers 540 may not be able to output frame updates for processing as quickly as new frame updates are received. According to the techniques, one or more of the older frame updates may be dropped from WB buffers 540 to allow the new frame update to be buffered, processed, and transmitted.

As another example, processing pipeline 550 may be configured to use hardware acceleration to retrieve the frame updates from memory 532, WB buffers 540, frame buffers 542, and/or CPBs 544. For example, processing pipeline 550 may use hardware accelerator 536 to retrieve the frame updates for processing by the processing units in processing pipeline 550 instead of a central processing unit (CPU) of source device 520. Using hardware accelerator 536 may reduce the processing load on the CPU of source device 520, which may increase frame rate and reduce latency in source device 520.

The image format for pixels of a captured frame of the media data is typically one of RGB888, RGB565, or YUV raw formats. Accessing a standard memory copy of a captured frame of the media data using the CPU of source device 520 will take too much of the CPU load to achieve high frame rate updates. When media data processing for the WD system consumes too much of the CPU processing load at source device 520, a user may notice the latency or slowness of media applications executing on source device 520 and on the sink devices in the WD system. The techniques include using hardware accelerator 536 to perform direct memory access (DMA) to retrieve the frame updates held in memory 532 or one of the buffers and move the frame updates between processing units in processing pipeline 550, independently of the CPU.

Encoder 562 within source device 520 may be hardware and/or software based. After VPE 560 renders the frame updates into frame buffers 542, encoder 562 encodes the frame updates. The encoded frame updates may be buffered in CPBs 544 prior to packet formation by packetizer 564 and transmission to the sink devices by wireless modem 534. In some cases, CPBs 544 may be configured to buffer a pointer to an encoded frame update stored in memory 532, instead of making an additional memory copy of the encoded frame update for buffering in CPBs 544. As an example, the pointer may specify a source address of the encoded frame update in memory 532 such that the encoded frame update is referenced in CPBs 544 but the actual memory copy is held in memory 532. In this way, source device 520 may avoid the cost of generating and storing an additional memory copy of the encoded frame update. In other examples, the techniques may use other methods to save the cost of an additional memory copy. More specifically, the techniques may include using mapped memory or send/receive requests to memory 532 in order to reference the encoded frame updates within CPBs 544 without making additional memory copies of the encoded frame updates.

In a further example, the techniques also include retransmission (i.e., duplicated push) of encoded frame updates from source device 520 to ensure timely receipt by the sink devices to further reduce latency in the WD system. The duplicated push may be especially useful in the case of a poor communication channel in which many media data packets may be dropped between source 520 and the sink devices. In one example, source device 520 may not rely on feedback from the sink devices to retransmit lost frames. Instead, wireless modem 534 of source device 520 may automatically retransmit a frame update after a predetermined period of time if a new frame update has not been received for transmission to the sink devices. For example, wireless modem 534 may automatically retransmit the last frame update after approximately 13 seconds if a new frame update is not received. In other cases, wireless modem 534 may retransmit the last frame update after approximately 10 seconds or less.

The duplicated push performed at source device 520 may enable the display content to recover from corrupted frames at the sink devices due to unreliable transportation. For example, when wireless modem 534 of source device 520 uses User Datagram Protocol (UDP), a relatively unreliable transportation protocol compared to, e.g., Transmission Control Protocol (TCP), wireless modem 534 may perform the duplicated push to retransmit the last frame update if a new frame update is not received after the predetermined period of time. In some examples, the duplicated push interval may be dynamically adjustable based on the type of media data being transmitted. In the case of media data for a User Interface (UI) or gaming application, a lost frame is noticeable and will negatively impact the user experience of the UI application in the WD system. In the case of media data for a video playback application, a lost frame will not be readily noticeable and will have little or no effect on the user experience of the video playback application. For UI and gaming applications, therefore, wireless modem 534 may be configured to perform duplicated push more frequently than for video playback applications. For example, for UI and gaming applications, the duplicated push interval may be reduced to approximately 10 seconds or less.

In some cases, a similar duplicated push mechanism may be used to push frames out of encoder 562 of source device 520 and/or a decoder in each of the sink devices. Typically, encoders and decoders do not automatically output each coded frame, but need to receive a subsequent frame to push out the previously coded frame. The techniques, therefore, may improve synchronization between source device 520 and the one or more sink devices by providing an additional push to output the coded frame updates.

In addition, the techniques of this disclosure also include prioritizing transport of audio data over transport of video data between source device 520 and the sink devices in the WD system. The transport of video data packets is tied to the transport of associated audio data packets such that ensuring that all the audio packets reach the sink device reduces latency at the sink device waiting to receive dropped packets. Pipeline manager 538 may configure an audio pipeline path to include more buffering than a video pipeline path in source device 520. The additional buffering ensures that fewer audio packets will be dropped at source device 520. Wireless modem socket 570 may provide a higher priority transportation queue for the audio pipeline path than for the video pipeline path.

The higher priority transportation queue ensures that the audio packets will be queued for transport at source device 520 before the corresponding video packets to avoid delays or stalls in the video pipeline path due to video packets waiting for the corresponding audio packet to be queued.

Conventionally, both audio and video processing pipeline paths have a same or similar amount of buffering and transportation priority. Because the audio data requires more careful processing and transportation to ensure all the media data is received at the sink devices, conventional video pipeline paths in source devices delay or stall transport of video data until the associated audio data is ready, which introduces additional latency into the WD system. By prioritizing the audio pipeline path, the additional delay or stall time in the video pipeline path is unnecessary.

According to the techniques, the prioritized transport of audio data may be achieved by setting a type of service (TOS) field in the media data packets to indicate whether the packet includes audio or video traffic. For example, if the communication channel supports Wi-Fi Multimedia (WMM), the TOS field may indicate an access category defined by WMM for prioritization purposes including voice, video, best-effort, and background. The TOS fields in the media data packets enable wireless modem socket 570 in source device 520 to place audio packets and video packets in the different queues with the different priority levels.

In addition, source device 520 may receive feedback information from the sink devices describing transport conditions of the communication channel with the sink devices. For example, the feedback information may include an error rate or packet loss determined at a sink device and communicated to source device 520. In some cases, the feedback information may be sent from the sink devices to source device 520 over a UIBC established between the sink devices and source device 520 in the WD system. In other cases, the feedback information may be sent to source device 520 over a different socket link. Additionally, the feedback information may be communicated using RTCP or some other customized signaling.

In response, pipeline manager 538 of source device 520 may modify processing pipeline 550 of source device 520 based on the feedback information. In one example, in response to receiving feedback information describing a poor communication channel, source device 520 may increase a duplicate push interval to retransmit the media data packets, e.g., to more than 10 seconds or more than 13 seconds, or change a data rate for processing and transmitting the media data packets. In another example, in response to the feedback information, source device 520 may generally adjust buffer sizes, encoding parameters, or dynamically switch between types of transport protocols. For example, in response to feedback information describing of a poor communication channel, source device 520 may switch from a Real Time Protocol (RTP)/User Datagram Protocol (UDP) communication channel, which is a relatively unreliable transportation protocol, to an RTP/Transmission Control Protocol (TCP) transportation channel.

Figure 6:
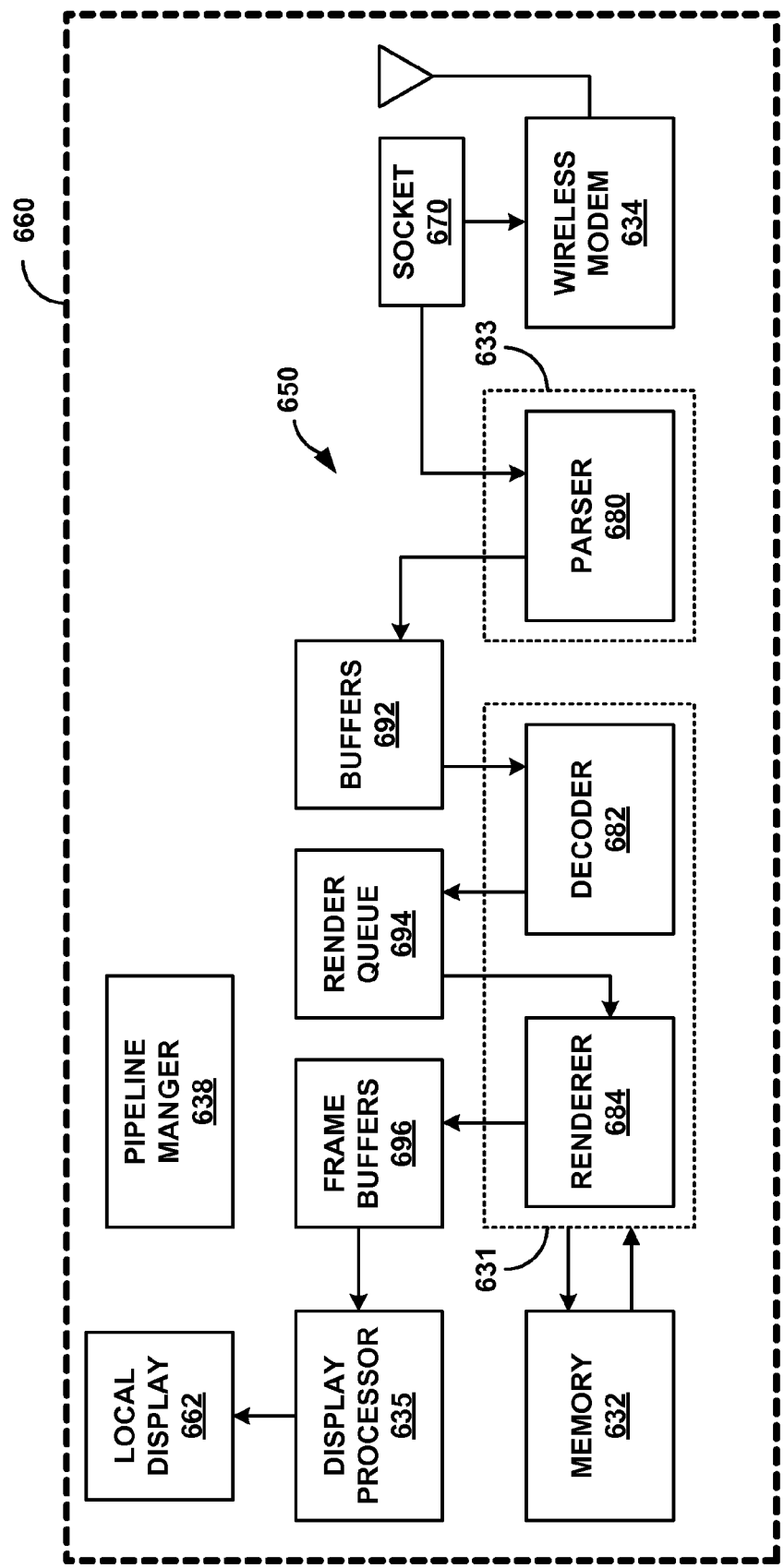
FIG. 6 is a block diagram illustrating an example of a sink device capable of supporting techniques of this disclosure to reduce latency in the processing pipeline of the sink device and improve video playback at the sink device.

FIG. 6 is a block diagram illustrating an example of a sink device 660 capable of supporting techniques of this disclosure to reduce latency in a processing pipeline 650 of sink device 660 and improve video playback at sink device 660. Sink device 660 may be a device similar to sink device 160 from FIG. 1 or sink device 260 from FIG. 3, and may operate in the same manner as sink device 160 or sink device 260.

Sink device 660 includes local display 662, display processor 635, memory 632, wireless modem socket 670, wireless modem 634, and processing pipeline 650. Processing pipeline 650 includes buffers and processing units executed by processor 631 and transport unit 633. Specifically, processing pipeline 650 includes a parser 680 within transport unit 633, and decoder 682 and renderer 684 within processor 631. In addition, processing pipeline 650 includes buffers 692 positioned between parser 680 and decoder 682, a render queue 694 positioned between decoder 682 and renderer 684, and frame buffers 696 between renderer 684 and display processor 635.

Sink device 660 also includes a pipeline manager 638. According to the techniques of this disclosure, pipeline manager 638 configures processing pipeline 650 to provide customized playback at sink device 660 based on the type of media data received from the source device. Specifically, pipeline manager 638 configures processing pipeline 650 to modify rendering based on whether the media data includes audio data.

For example, if the media data only includes video data and does not include audio data, renderer 684 included in processing pipeline 650 of sink device 660 is configured to perform accelerated rendering of the video data. Upon detecting that the media data does not include audio data, pipeline manager 638 may disable synchronization at renderer 684. Renderer 684 may then render the video data without waiting to synchronize with non-existent audio data.

Conventionally, media data processing pipelines are designed for both video and audio data, or for only video data with no audio data. Upon receiving only video data, a media data processing pipeline designed for both video and audio data processes the video data at the same speed required to processes both video and audio data, including wait time for synchronization with non-existent audio data. The additional processing time unnecessarily adds latency into the processing pipeline. The techniques of this disclosure enable decoder 682 of sink device 660 to detect a type of media data received and dynamically adjust the playback processing speed at renderer 684 based on the type of media data. For example, decoder 682 may detect the presence or absence of an audio time stamp in the media data where the presence of an audio time stamp indicates that the media data from the source device includes audio data.

For example, in the case of media data for a UI application, there is no accompanying audio data with the video data. For UI application data, pipeline manager 638 may disable synchronization at renderer 684 of sink device 660. In this way, renderer 684 may render the video data for the UI application as quickly as possible without the wait time for processing and synchronization of non-existent audio data. In the case of media data for a video playback application, there may be accompanying audio data with the video data. For video playback application data with audio data, pipeline manger 638 may enable synchronization and renderer 684 may render the synchronized video data and the audio data at a normal processing speed.

In addition, the techniques also enable pipeline manager 638 to adjust a sample time at renderer 684 based on media time applicable for renderer 684. In this way, when the sample time of the media data set by the source device is not be applicable for renderer 684 at sink device 660, pipeline manager 638 may select an applicable sample time for the media data based on the media time.

As another example, if the media data includes both video data and audio data, pipeline manager 638 may reduce an audio rendering start-up timer and renderer 684 may render synchronized audio and video data according to the reduced start-up timer. In this way, the techniques may reduce latency at sink device 660 even when the media data includes audio data.

In some playback engines, audio rendering may be delayed at start up to avoid missing or dropping incoming audio packets. The delay time may be necessary for some communication system, such as a Bluetooth system. For other communication systems, such as a WD system, the delay is unnecessary and adds to the end-to-end latency when synchronization is enabled. For example, in order to compensate for Advanced Audio Distribution Profile (A2DP) initialization time, e.g., 1 second or more, which is necessary for the Bluetooth system, the audio rendering startup timer at renderer 684 of sink device 660 may be set relatively high. The audio data rendering will be delayed by the startup time and the incoming samples will have to be buffered before being input to renderer 684. If the audio data is delayed, the corresponding video data will also have to be delayed to keep the audio data and the video data synchronized.

According to the techniques described in this disclosure, for the WD system, the audio rendering startup timer at renderer 684 is reduced to reduce latency and to avoid audio and video data stalls in sink device 660. For example, in the case of a WD system, pipeline manager 638 may reduce or eliminate the audio rendering startup timer in order to provide faster rendering and playback at sink device 660. The audio rendering startup timer may be reduced to be less than 1 second, less than 50 milliseconds (ms), and in some cases less than 20 ms. In the case of a Bluetooth system, pipeline manager 638 may dynamically reset the audio rendering startup timer to be relatively high, e.g., 1 second or more.

In another example, pipeline manager 638 may configure processing pipeline 650 in sink device 660 prior to receiving the media data from the source device based on stream header information exchanged during a capability negotiation period of the communication session in order to reduce latency due to set up time. In order to pre-configure processing pipeline 650, the source device and sink device 660 first exchange stream header information that includes information about the media data to be transmitted over the communication channel. The stream header information may be exchanged using Real Time Streaming Protocol (RTSP) or other proprietary messages. Pipeline manager 638 then sets up processing pipeline 650 based on the received header information, including configuring buffer sizes, rendering start-up timers, synchronization wait timers, and programmable decoder settings. After processing pipeline 650 is configured, sink device 660 notifies the source device to begin transmitting the media data.

Additionally, prior to processing media data received from the source device, sink device 660 may flush one or more samples of the received media data from decoder 682. The first few samples of the media data may comprise old, stalled samples from the source device pipeline generated during the negotiation period of the communication session. The techniques provide a duplicated push to retransmit frames from the source device to push the stalled samples out of decoder 682 at sink device 660. In this way, sink device 660 does not waste any processing time on old, stalled samples of media data.

In some cases, pipeline manager 638 at sink device 660 may insert dummy frames to decoder 682 to push samples out of decoder 682 for rendering by renderer 684. This may be necessary when decoder 682 is not programmable and does not support picture order count (POC) decoding of incoming media data samples. In other cases, where decoder 682 is programmable and supports POC, pipeline manager 638 may configure decoder 682 to output media data samples in according to PIC or decoding order, instead of display order. Configuring programmable decoder 682 to output sample in decoding order ensures that every input sample to decoder 682 is output as soon as the decoding is complete. In this way, stalls and delays at decoder 682 may be reduced or eliminated. In addition, pipeline manager 638 may minimize a number of buffers included in render queue 694 between decoder 682 and renderer 684 to further reduce latency in sink device 660. For example, render queue 694 may include 4 or fewer buffers to hold the media data prior to rendering by renderer 684.

In addition, according to the techniques of this disclosure, pipeline manager 638 configures processing pipeline 650 to provide customized buffering at sink device 660 based on application awareness for the media data received from the source device. Specifically, decoder 682 of source device 660 learns a type of application for the received media data, and pipeline manager 638 configures processing pipeline 650 to adjust the size of buffers in processing pipeline 650. In this way, sink device 660 may achieve an appropriate balance between smoothness and latency for the application type for the media data. Pipeline manager 638 may adjust the size of render queue 694, frame buffers 696, or any other buffer included in processing pipeline 650 that holds data prior to display in the application for the media data.

For example, when the media data is for a video playback application, quality or smoothness of the playback is highest priority at sink device 660 and the low latency techniques described above may cause visible jitter. In this case, pipeline manager 638 may increase the size of buffers in processing pipeline 650 to increase smoothness of the media data in the video playback application. On the contrary, when the media data is for a user interface (UI) application or a gaming application, low latency is the highest priority at sink device 660. In this case, pipeline manager 638 may decrease the size of buffers in processing pipeline 650 to reduce latency for the UI or gaming application. By reducing the buffer size, pipeline manager 638 enables the media data for the UI or gaming application to move through processing pipeline 650 in sink device 660 without stalls and delays.

In some cases, the type of application for the media data may be detected at the source device and signaled to sink device 660 in the WD system. For example, sink device 660 may detect the application for the received media data based on an indication received from the source device. The source device may determine that the media data is for a video playback application by detecting incoming audio rates and screen update rates of the audio data. The source device may send an indication to sink device 660 of the start of media data for the video playback engine, and send another indication to sink device 660 of the end of media data for the video playback application. Sink device 660 may receive flags or other indicators with the media data in a media player protocol or in another proprietary protocol.

In other cases, the type of application for the media data may be detected at sink device 660. Decoder 682 at sink device 660 may determine the type of application for the received media data based on audio time stamps included in the received media data at regular intervals. It may be assumed that when the media data includes video data with corresponding audio data at regular intervals, the media data is for a video playback application. Decoder 682 may, therefore, detect the audio time stamps occurring at regular intervals while receiving media data for a video playback application.

In either case, when decoder 682 of sink device 660 learns that the received media data is for a video playback application, pipeline manager 638 increases the size of buffers, e.g., render queue 694 or frame buffers 696, used to hold the media data prior to display in the video playback application. For example, pipeline manager 638 may configure processing pipeline 650 to include more than four buffers in render queue 694, and to include more than four frame buffers 696, e.g., two ping-pong buffers and at least 2 hold buffers. When the buffers are capable of holding a larger amount of media data, the risk of dropping frames decreases and the amount of jitter in the playback also decreases.

On the other hand, when decoder 682 of sink device 660 learns that the received media data is not for a video playback application but is for a UI or gaming application, pipeline manager 638 decreases the size of buffers used to hold the media data prior to display in the UI or gaming application. For example, pipeline manager 638 may configure processing pipeline 650 to include less than four buffers in render queue 694, and to include four or fewer frame buffers 696, e.g., two ping-pong buffers and at most 2 hold buffers. In this way, the media data moves through processing pipeline 650 of sink device 660 faster to improve latency.

In some cases, pipeline manager 638 may pause renderer 684 for a period of time in order to store additional media data samples in render queue 694. For example, pipeline manager 638 may pause renderer 684 until a threshold number of samples are stored in render queue 694, and then resume rendering to increase smoothness of the video playback. In some cases, the threshold number of samples may be set to eight samples, 16 samples, or in some cases more than 16 samples.

In addition, sink device 660 may provide feedback information to the source device describing transport conditions of the communication channel with the source device. The source device may modify its processing pipeline based on the feedback information, as described in more detail above with respect to FIG. 5. For example, the feedback information may include an error rate or packet loss determined at sink device 660 and communicated to the source device. In some cases, wireless modem 634 may send the feedback information from sink device 660 to the source device over a UIBC established between sink device 660 and the source device in the WD system. In other cases, wireless modem 634 may send the feedback information from sink device 660 to the source device over a different socket link. Additionally, wireless modem 634 may communicate the feedback information using RTCP or some other customized signaling.

Figure 7:
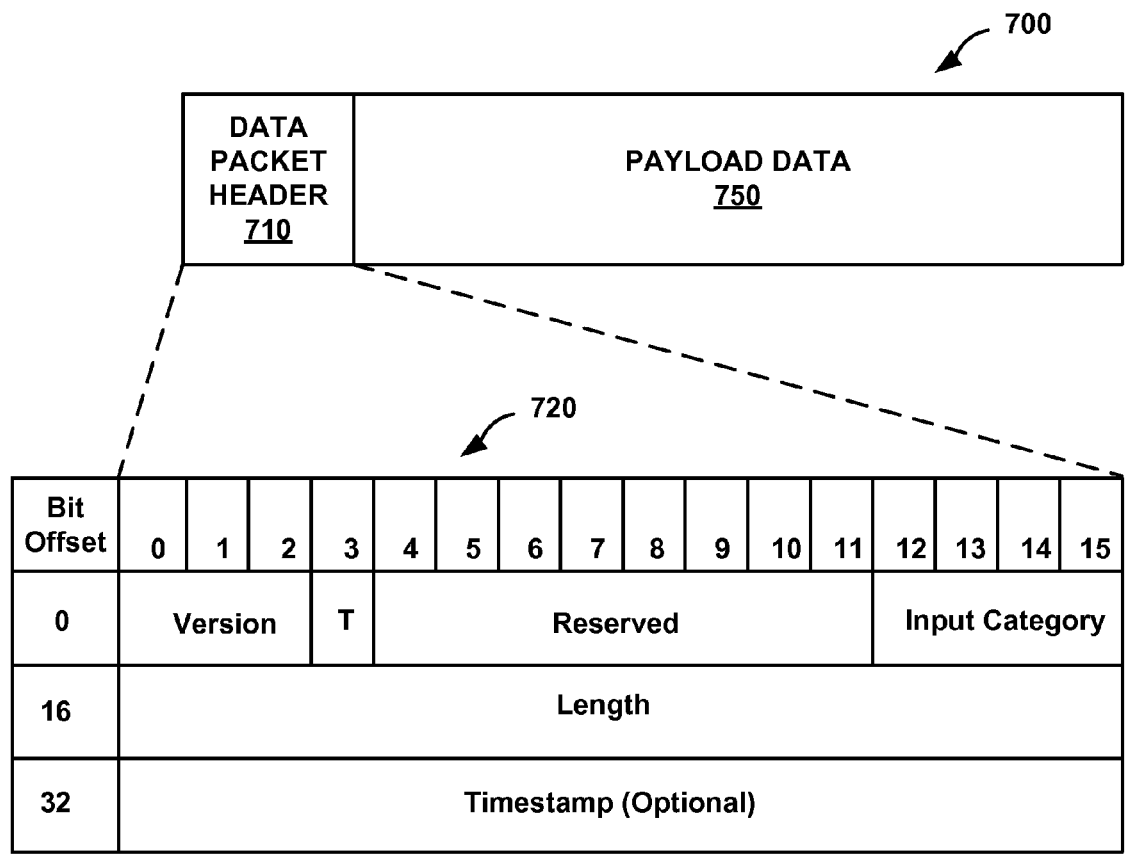
FIG. 7 is a conceptual diagram illustrating an example data packet that may be used for delivering user input data and/or feedback data obtained at a sink device to a source device.

FIG. 7 is a conceptual diagram illustrating an example data packet 700 that may be used for delivering user input data and/or feedback data obtained at a sink device to a source device. Aspects of data packet 700 will be explained with reference to FIG. 1, but the techniques discussed may be applicable to additional types of WD systems. Data packet 700 may include a data packet header 710 followed by payload data 750. Data packet 700 may, for example, be transmitted from sink device 160 to source device 120 in order to signal user input data received at sink device 160, or to signal feedback information describing transport conditions of communication channel 150.

The type of data, e.g., user input data or feedback data, included in payload data 750 may be identified in data packet header 710. In this way, based on the content of data packet header 710, source device 120 may parse payload data 750 of data packet 700 to identify the user input data or the feedback data from sink device 160. As used in this disclosure, the terms "parse" and "parsing" generally refer to the process of analyzing a bitstream to extract data from the bitstream. Extracting data may, for example, include identifying how information in the bitstream is formatted. As will be described in more detail below, data packet header 710 may define one of many possible formats for payload data 750. By parsing data packet header 710, source device 120 can determine how payload data 750 is formatted, and how to parse payload data 750 to extract the user input commands or the feedback information.

In some examples, data packet header 710 may include one or more fields 720 formatted as shown in FIG. 7. The numbers 0-15 and bit offsets 0, 16 and 32 adjacent to fields 720 are intended to identify bit locations within data packet header 710 and are not intended to actually represent information contained within data packet header 710. Data packet header 710 includes a version field, a timestamp flag, a reserved field, an input category field, a length field, and an optional timestamp field. In the example of FIG. 7, the version field is a 3-bit field that may indicate the version of a particular communications protocol being implemented by sink device 160. The value in the version field may inform source device 120 how to parse the remainder of data packet header 710 as well as how to parse payload data 750.

In the example of FIG. 7, the timestamp flag (T) is a 1-bit field that indicates whether or not the timestamp field is present in data packet header 710. When present, the timestamp field is a 16-bit field containing a timestamp based on multimedia data that was generated by source device 120 and transmitted to sink device 160. The timestamp may, for example, be a sequential value assigned to frames of video by source device 120 prior to the frames being transmitted to sink device 160. Upon parsing data packet header 710 and determining whether the timestamp field is present, source device 120 knows whether it needs to process a timestamp included in the timestamp field. In the example of FIG. 7, the reserved field is an 8-bit field reserved for future versions of the particular protocol identified in the version field.

In the example of FIG. 7, the input category field is a 4-bit field to identify an input category for the data contained in payload data 750. For example, sink device 160 may categorize user input data to determine an input category. User input data may be categorized based on the device from which a command is received or based on properties of the command itself. Sink device 160 may also categorize feedback information to determine an input category. Feedback information may be categorized based on the type of feedback information determined at sink device 160 or the type of operation requested at source device 120 based on the feedback information. The value of the input category field, possibly in conjunction with other information of data packet header 710, identifies to source device 120 how payload data 750 is formatted. Based on this formatting, source device 120 can parse payload data 750 to extract the user input commands or the feedback information.

The length field may comprise a 16-bit field to indicate the length of data packet 700. As data packet 700 is parsed by source device 120 in words of 16 bits, data packet 700 can be padded up to an integer number of 16 bits. Based on the length contained in the length field, source device 120 can identify the end of payload data 750 (i.e. the end of data packet 700) and the beginning of a new, subsequent data packet.

The various sizes of the fields provided in the example of FIG. 7 are merely intended to be explanatory, and it is intended that the fields may be implemented using different numbers of bits than what is shown in FIG. 7. Additionally, it is also contemplated that data packet header 710 may include fewer than all the fields discussed above or may use additional fields not discussed above. Indeed, the techniques of this disclosure may be flexible, in terms of the actual format used for the various data fields of the packets.

Figure 8:
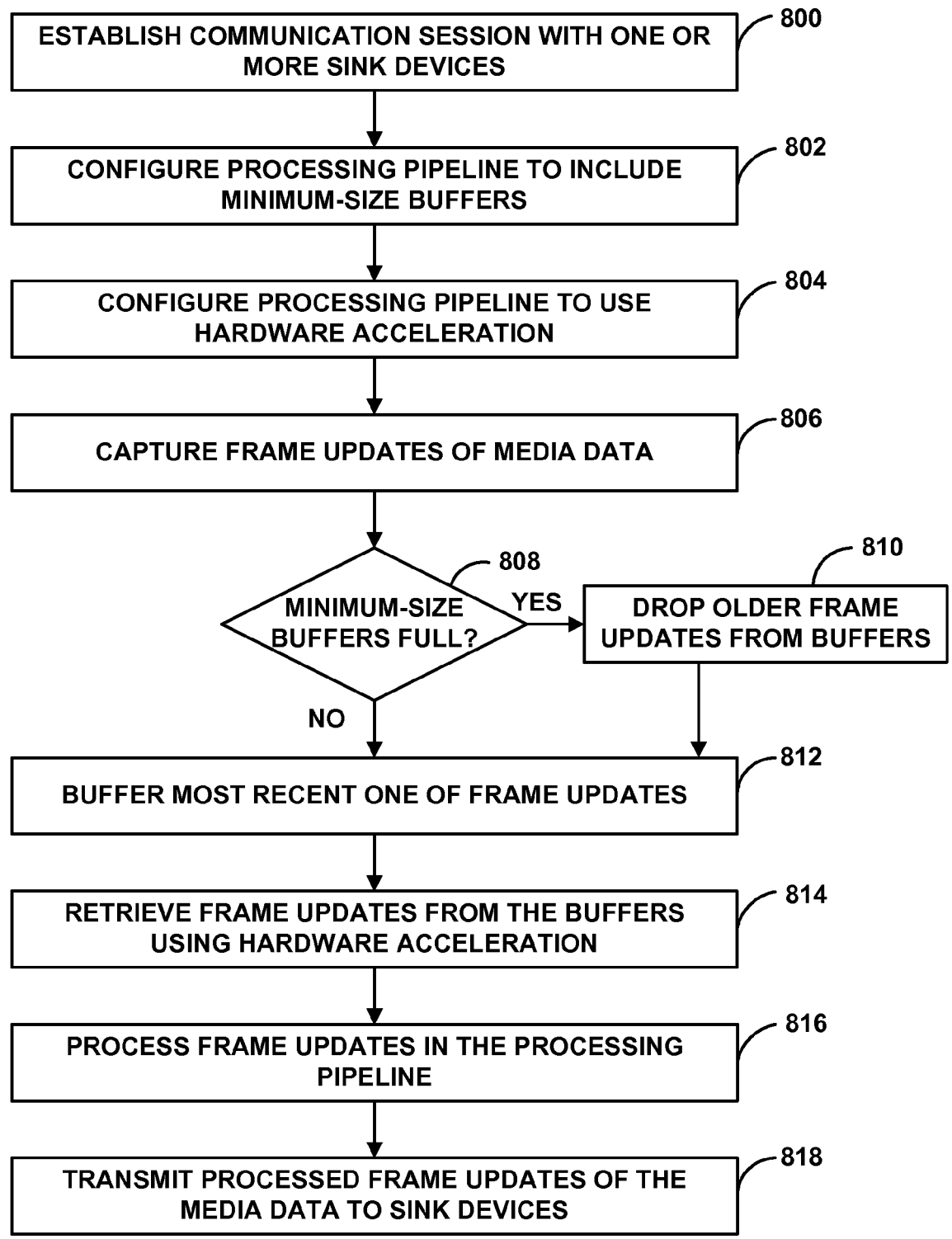
FIG. 8 is a flowchart illustrating an exemplary operation of a source device capable of supporting low-latency frame capture and buffering of media data in a processing pipeline.

FIG. 8 is a flowchart illustrating an exemplary operation of a source device capable of supporting low-latency frame capture and buffering of media data in a processing pipeline. The illustrated operation will be described with respect to processing pipeline 550 included in source device 520 from FIG. 5. In other examples, the illustrated operation may be performed by source device 220 from FIG. 2, source device 120 from FIG. 1, or another source device of a WD system.

Source device 520 first establishes a communication session with one or more sink devices in a WD system (800). Source device 520 may establish the communication session according to a capability negotiation with the sink devices. According to the techniques of this disclosure, in order to support low-latency frame capture and buffering of media data, pipeline manager 538 of source device 520 configures processing pipeline 550 to include minimum-size buffers (802). Specifically, pipeline manager 538 may configure processing pipeline 550 to reduce the size of WB buffers 540 to only include two ping-pong buffers. Reducing the number of buffers for media data to move through along processing pipeline 550 will reduce latency at source device 520. In addition, pipeline manager 538 may configure processing pipeline 550 to reduce the size of frame buffers 542 to minimum-size frame buffers capable of holding at least a most recent frame update of the media data.

Further, according to the techniques, pipeline manager 538 may configure processing pipeline 550 to use hardware accelerator 536 to perform direct memory access of media data in processing pipeline 550 (804). Retrieving frame updates of the media data from memory 532 and the buffers in processing pipeline 550 using a standard memory copy uses too much CPU load. In order to increase a frame rate of the media data and reduce latency, processing pipeline 550 instead uses hardware accelerator 536 to access and move the frame updates between processing units of processing pipeline 550, independent of the CPU.

After processing pipeline 550 is configured in source device 520, source device 520 may begin processing media data for transmission to the sink devices in the WD system. Display processor 535 captures frame updates of media data from a media source (806). The media source may be a camera or other media capture device included within source device 520, or may be an external media source connected to source device 520 through either a wired or wireless connection. The frame updates may include full frames of the media data, partial frames that represent only updated portions of frames, or some combination of the two.

After capturing a frame update, display processor 535 sends a request to WB buffers 540 to determine whether the minimum-size WB buffers 540 are full (808). If the minimum-size WB buffers 540 are full (YES branch of 808), then receiving the request from display processor 535 will trigger WB buffers 540 to drop one or more of the older frame updates held in WB buffers 540 (810). After dropping the older frame updates, WB buffers 540 buffer the most recent frame update captured by display processor 535 (812). If the minimum-size WB buffers 540 are not full upon receiving the request from display processor 525 (NO branch of 808), then WB buffers 540 may immediately buffer the most recent frame update captured by display processor 535 (812). Similar processes may be used for buffering the frame updates in other minimum-sized buffers along processing pipeline 550, such as frame buffers 542. Once the most recent frame update is held in WB buffers 540, the frame update may then be written from WB buffers 540 to memory 532 via hardware accelerator 536.

In addition, hardware accelerator 536 retrieves the frame updates from WB buffers 540 and moves the frame updates between processing units and buffers along processing pipeline 550 (814). The retrieved frame updates are then processed in processing pipeline 550 for transmission to the sink devices in the WD system (816). For example, within processor 531, video processing engine (VPE) 560 renders the frame updates into frame buffers 542 and encoder 562 encodes the frames updates from frame buffers 542. The encoded frame updates may be buffered in coded picture buffers (CPBs) 544 prior to forming the frame updates into packets with packetizer 564 within transport unit 533. According to the techniques, instead of buffering a memory copy of the encoded frame updates in CPBs 544, a pointer to the encoded frame updates that are stored in memory 532 may be buffered in CPBs 544 without creating a memory copy of the encoded frame update.

Wireless modem 534 then transmits the processed frame updates to the one or more sink devices over the communication session in the WD system (818). After transmitting the processed frame updates, wireless modem 534 may retransmit the processed frame updates (i.e., perform duplicate push) after a predetermined period of time until a new frame update is received for transmission. The duplicate push may reduce end-to-end latency in the WD system by ensuring that the sink devices receive the transmitted frame updates and do not waste processing time waiting for dropped packets.

Figure 9:
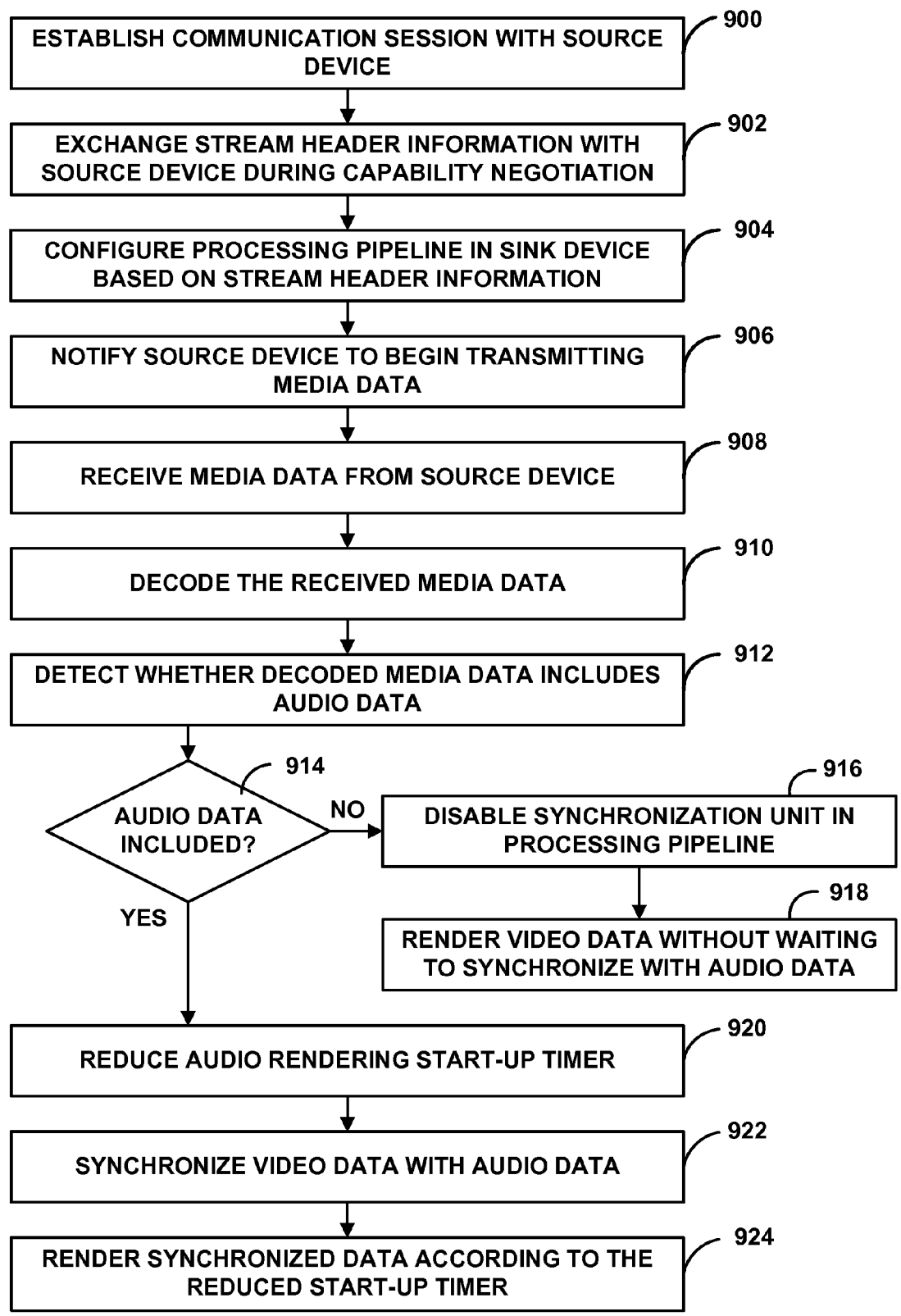
FIG. 9 is a flowchart illustrating an exemplary operation of a sink device capable of supporting customized video playback in a processing pipeline.

FIG. 9 is a flowchart illustrating an exemplary operation of a sink device capable of supporting customized video playback in a processing pipeline. The illustrated operation will be described with respect to processing pipeline 650 included in sink device 660 from FIG. 6. In other examples, the illustrated operation may be performed by sink device 360 from FIG. 3, sink device 160 from FIG. 1, or another sink device of a WD system.

Sink device 660 first establishes a communication session with a source device in a WD system (900). Sink device 660 may establish the communication session according to a capability negotiation with the source device. According to the techniques of this disclosure, in order to support customized video playback in processing pipeline 650, sink device 660 exchanges stream header information for a stream of media data with the source device during the capability negotiation period for the communication session (902). Pipeline manager 638 then configures processing pipeline 650 in sink device 660 based on the received stream header information (904).

For example, based on the stream header information, pipeline manager 638 may configure buffer sizes, rendering start-up timers, synchronization wait timers, and programmable decoder settings, and the like within processing pipeline 650 prior to receiving media data from the source device. Once processing pipeline 650 is configured in sink device 650 for the stream of media data, wireless modem 634 may notify the source device to begin transmitting the stream of media data to sink device 660 (906). In this way, upon receiving media data to be decoded and rendered from the source device, sink device 660 does not waste any processing time to set up processing pipeline line 650.

After processing pipeline 650 is configured, sink device 660 begins receiving media data from the source device (908). Parser 680 de-packetizes the encoded media data. Decoder 682 then decodes the received media data (910). The received media data includes at least video data. Upon decoding, decoder 682, or some other processing unit in processing pipeline 650, detects whether the decoded media data includes audio data (912). For example, decoder 682 may determine that the media data includes audio data by detecting an audio time stamp in the received media data indicating that the media data includes audio data. Similarly, decoder 682 may determine that the media data only includes video data based on the absence of an audio time stamp in the received media data.

If audio data is not included in the media data (NO branch of 914), processing pipeline 650 performs accelerated rendering of the video data. More specifically, pipeline manager 638 disables synchronization of the video data with audio data at renderer 684 (916). Renderer 684 then renders the video data without waiting to synchronize with non-existent audio data (918). In some cases, when the media data includes only video data, pipeline manager 638 may not explicitly disable synchronization, but may configure renderer 684 to ignore any audio data and render the video data without waiting to synchronize with non-existent audio data. In addition, pipeline manger 638 may also increase a sample time of the video data based on a media time applicable for renderer 684. In this way, renderer 684 may perform accelerated rendering of the video data according to the increased sample time.

If audio data is included in the media data (YES branch of 914), pipeline manager 638 may reduce an audio rendering start-up timer at renderer 684 (920). For example, in the case of some communication systems, the audio rendering start-up timer at renderer 684 may be kept high to compensate for initialization time of the communication system. This is not necessary for the WD system. Pipeline manager 638, therefore, may reduce the audio rendering start-up timer for the WD system in order to reduce latency even when audio data is included in the media data. Renderer 638 may then synchronize the video data with the audio data (922), and render the synchronized video data and audio data according to the reduced start-up timer (924).

In some cases, frames of the video data may stall in decoder 682 and cause additional latency at sink device 660 with renderer 684 waiting to receive the next video frame from decoder 682. According to the techniques, when decoder 682 is a non-programmable decoder, pipeline manager 638 may insert dummy frames into the video data at sink device 660 to push the decoded samples of the video data out of decoder 682 for rendering. When decoder 682 is a programmable decoder, pipeline manager 638 may configure programmable decoder 682 to output the decoded samples of the video data in decoding order for rendering as soon as decoding is complete. Typically, decoders output samples in display order by default. In this case, pipeline manager 638 may change the default setting to move the decoded frames through decoder 682 faster.

Additionally, upon receiving the media data from the source device, pipeline manger 638 may flush one or more samples of the received media data out of decoder 682 prior to rendering the received media data. In some cases, the first few samples of media data transmitted from the source device may include stalled samples of old media data at the source device. Pipeline manager 638 may flush these samples from sink device 660 to avoid spending processing time and resources on old media data.

Figure 10:
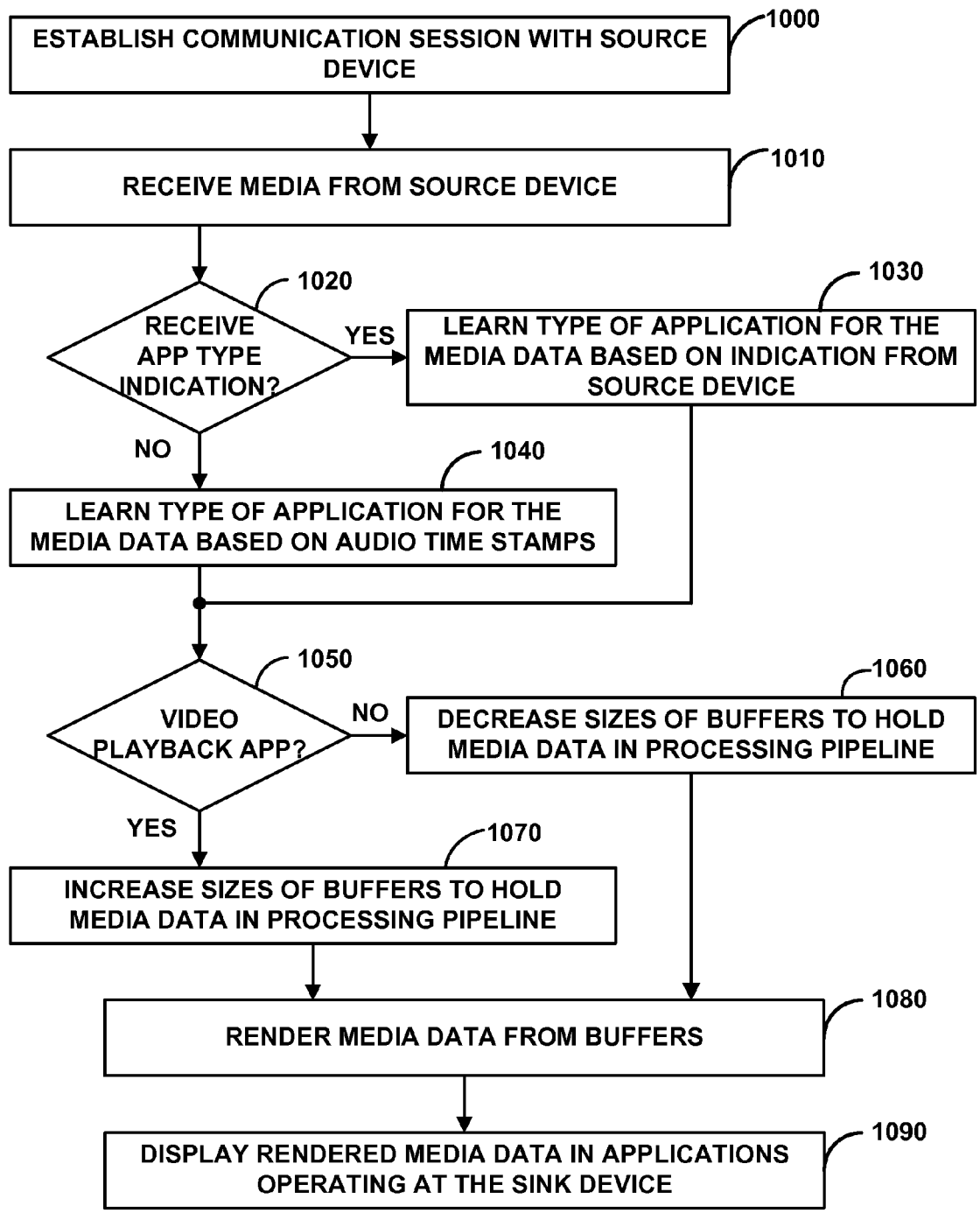
FIG. 10 is a flowchart illustrating an exemplary operation of a sink device capable of supporting customized buffering based on media data application awareness in a processing pipeline.

FIG. 10 is a flowchart illustrating an exemplary operation of a sink device capable of supporting customized buffering based on media data application awareness in a processing pipeline. The illustrated operation will be described with respect to processing pipeline 650 included in sink device 660 from FIG. 6. In other examples, the illustrated operation may be performed by sink device 360 from FIG. 3, sink device 160 from FIG. 1, or another sink device of a WD system.

Sink device 660 first establishes a communication session with a source device in a WD system (1000). Sink device 660 may establish the communication session according to a capability negotiation with the source device. Sink device 660 then begins receiving media data from the source device (1010). According to the techniques of this disclosure, in order to support customized buffering based on a type of application for media data in processing pipeline 650, sink device 660 learns the type of application for the received media data and pipeline manager 638 adjusts sizes of buffers in processing pipeline 650 based on the type of application.

In order to learn the application type for the received media data, parser 680 first determines whether an indication of the type of application for the media data is received from the source device with the media data (1020). If an indication is received from the source device (YES branch of 1020), decoder 682 of sink device 660 learns the type of application for the media data based on the indication from the source device (1030). In this case, the source device in the WD system detects the type of application for the media data, and transmits the media data with the indication of the type of application for the media data to sink device 660. In some cases, for example, sink device 660 may receive an indication from the source device of a stream of media data for a video playback application, and sink device 660 may also receive an indication from the source device of an end of the stream of media data for the video playback application.

If an indication is not received from the source device (NO branch of 1020), decoder 682 of sink device 660 learns the type of application for the media data based on the presence or absence of audio time stamps in the media data (1040). For example, decoder 682 may determine that the media data is for a video playback application by detecting audio time stamps at regular intervals in the media data. As another example, decoder 682 may determine that the media data is for a UI or gaming application based on the absence of audio time stamps at regular intervals in the received media data.

When decoder 682 of sink device 660 learns that the type of application for the received media data is a UI or gaming application and not a video playback application (NO branch of 1050), pipeline manager 638 configures processing pipeline 650 to decrease sizes of the buffers that hold media data in processing pipeline 650 prior to display in the UI or gaming application (1060). For example, pipeline manager 638 may decrease the size of render queue 694 and/or the size of frame buffers 696 to reduce latency of the media data moving through the buffers. In the case of UI or gaming applications, the primary concern in the WD system is to provide a low latency user experience with video playback quality being a lesser concern.

When decoder 682 of sink device 660 learns that the type of application for the received media data is a video playback application (YES branch of 1050), pipeline manager 638 may increase sizes of the buffers that hold media data in processing pipeline 650 prior to display in the video playback application (1070). For example, pipeline manager 638 may increase the size of render queue 694 and/or the size of frame buffers 696 to improve the quality (i.e., smoothness) of the video playback in the video playback application. Although increasing the buffer sizes may increase latency, the primary concern in the case of video playback applications is to provide a high quality video playback user experience with some tradeoff of increased latency.

Renderer 684 renders the media data from the render queue 694 into frame buffers 696 in processing pipeline 650 for use in the type of application indicated for the media data (1080). Display processor 635 then displays the rendered media data from frame buffers 696 in the application for the media data operating at sink device 660 (1090).

In some cases, when the media data is for a video playback application, pipeline manager 638 may direct renderer 684 to pause rendering of the media data from render queue 694 in order for sink device 660 to receive additional samples of the media data. Pipeline manager 638 then directs renderer 684 to resume rendering of the media data from render queue 694 after a threshold number of samples of the media data are stored in render queue 694. In this way, the quality or smoothness of the video playback may be further improved by having multiple samples of the media data ready to be rendered in render queue 694.

Figure 11:
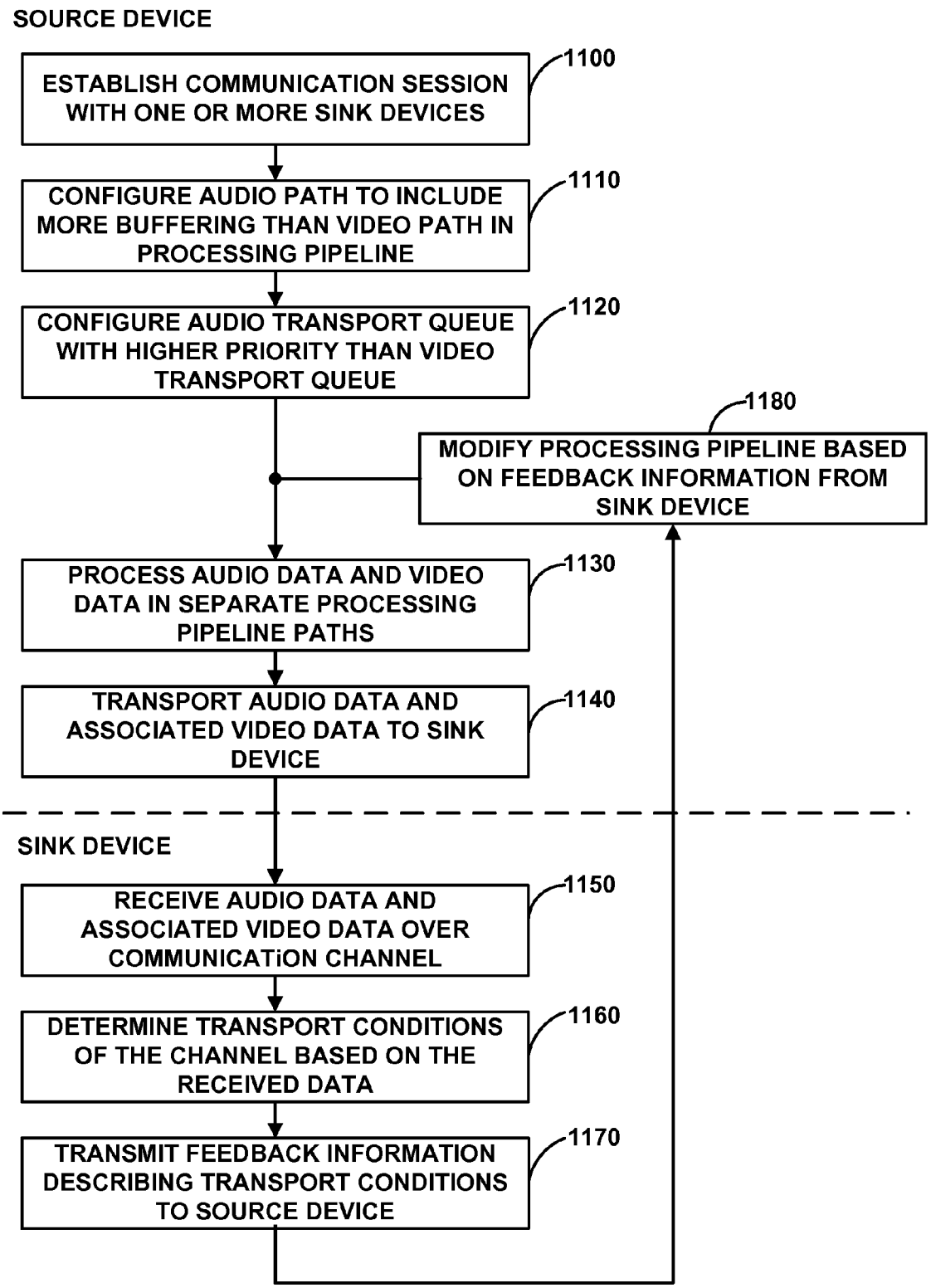
FIG. 11 is a flowchart illustrating an exemplary operation of a source device and a sink device capable of supporting prioritized transport of audio data in a WD system.

FIG. 11 is a flowchart illustrating an exemplary operation of a source device and a sink device capable of supporting prioritized transport of audio data in a WD system. The illustrated operation will be described with respect to processing pipeline 550 in source device 520 from FIG. 5 and with respect to processing pipeline 650 included in sink device 660 from FIG. 6. In other examples, the illustrated operation may be performed by source device 220 from FIG. 2, sink device 360 from FIG. 3, source device 120 and sink device 160 from FIG. 1, or other source devices and sink devices of a WD system.

Source device 520 first establishes a communication session with sink device 660 in a WD system (1100). Source device 520 and sink device 660 may establish the communication session according to a capability negotiation. According to the techniques of this disclosure, in order to provide prioritized transport of audio data, pipeline manager 538 in source device 520 configures an audio path in processing pipeline 550 to include more buffering than a video path in processing pipeline 550 (1110). In addition, pipeline manager 538 in source device 520 configures an audio transport queue in wireless modem socket 570 with higher priority than a video transport queue in wireless modem socket 570 (1120).

Once the prioritized transport path for audio data is configured, source device 520 begins processing audio data and video data in the separate processing pipeline paths (1130). After the audio and video data is processed, wireless modem 534 transports the audio data and associated video data from the separate transport queues in socket 570 to sink device 660 (1140).

Sink device 660 receives the audio data and associated video data from source device 520 over the communication channel in the WD system (1150). Processor 631 of sink device 660 may determine transport conditions of the communication channel based on the received media data (1160). For example, processor 631 of sink device 660 may determine an error rate or amount of packet loss for the media data after transport over the communication channel. Transport unit 633 of sink device 660 may generate a packet to transmit feedback information describing the transport conditions of the communication channel from sink device 660 back to source device 520 (1170). For example, wireless modem 634 may transmit the packet from sink device 660 over a UIBC or other feedback channel to source device 660 using RTCP.

Upon receiving the feedback information describing the transport conditions of the communication channel, pipeline manager 538 of source device 520 may modify processing pipeline 550 based on the feedback information from sink device 660 (1180). Once processing pipeline 550 is configured for the communication channel, source device 520 resumes processing audio data and video data in the separate processing pipeline paths (1130), and transporting the audio data and associated video data from the separate transport queues in socket 570 to sink device 660 (1140).

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. In some examples, computer-readable media may comprise non-transitory computer-readable media. Data storage media may be any available media that can be accessed by one or more computers or one or more processors to retrieve instructions, code and/or data structures for implementation of the techniques described in this disclosure.

By way of example, and not limitation, such computer-readable media can comprise non-transitory media such as RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various embodiments of the invention have been described. These and other embodiments are within the scope of the following claims.

What is claimed is:

1. A method comprising:
   establishing a communication session at a sink device with a source device in a Wireless Display (WD) system;
   receiving, with the sink device, media data from the source device, wherein the media data includes at least video data;
   decoding the received media data with a processing pipeline of the sink device;
   detecting whether the decoded media data includes audio data; and
   when the decoded media data does not include audio data, performing accelerated rendering of the video data with the processing pipeline of the sink device without waiting to synchronize the video data with audio data.

2. The method of 1, wherein performing accelerated rendering of the video data comprises disabling synchronization between the video data and audio data at a renderer included in the processing pipeline.

3. The method of 1, wherein performing accelerated rendering of the video data comprises configuring a renderer included in the processing pipeline to render the video data.

4. The method of claim 1, wherein performing accelerated rendering of the video data comprises increasing a sample time of the video data received from the source device based on a media time applicable for a renderer included in the processing pipeline, and rendering the video data according to the increased sample time.

5. The method of claim 1, wherein detecting whether the received media data includes audio data comprises detecting one of a presence or an absence of an audio time stamp in the received media data, wherein the presence of the audio time stamp indicates that the media data includes audio data.

6. The method of claim 1, further comprising:
   receiving stream header information from the source device during a capability negotiation period for the communication session prior to receiving the media data;
   configuring the processing pipeline of the sink device based on the stream header information; and
   after the processing pipeline is configured, notifying the source device to begin transmitting the media data.

7. The method of claim 1, wherein the processing pipeline of the sink device includes a decoder that is not programmable, further comprising inserting dummy frames into the video data at the sink device to push the decoded samples of the video data out of the decoder for rendering.

8. The method of claim 1, further comprising, when the received media data includes audio data:
   reducing an audio rendering start-up timer for a renderer included in the processing pipeline of the sink device;
   synchronizing the video data with the audio data; and
   rendering the synchronized audio data and video data according to the reduced start-up timer.

9. The method of claim 8, wherein configuring the processing pipeline based on the stream header information comprises configuring one or more of buffer sizes, rendering start-up timers, synchronization wait timers, and programmable decoder settings.

10. The method of claim 1, wherein the processing pipeline of the sink device includes a programmable decoder, further comprising configuring the programmable decoder to output the decoded samples of the video data in decoding order for rendering as soon as decoding is complete.

11. The method of claim 1, further comprising, upon receiving the media data from the source device, flushing one or more samples of the received media data out of a decoder included in the processing pipeline of the sink device prior to rendering the received media data, wherein the one or more samples comprise stalled samples of old media data from the source device.

12. The method of claim 1, further comprising transmitting feedback information describing transport channel conditions to the source device, wherein the feedback information is used to modify a processing pipeline of the source device.

13. The method of claim 1, wherein establishing the communication session at the sink device comprises receiving advertisements of the media data for the communication session from the source device, and sending a request to join the communication session to the source device.

14. A sink device comprising:
   a processing pipeline including one or more processing units configured to establish a communication session at the sink device with a source device in a Wireless Display (WD) system, receive media data from the source device, wherein the media data includes at least video data, decode the received media data, detect whether the received media data includes audio data, and, when the received media data does not include audio data, perform accelerated rendering of the video data without waiting to synchronize the video data with audio data; and
   a pipeline manager configured to manage the processing pipeline of the sink device.

15. The sink device of 14, wherein, when the received media data does not include audio data, the pipeline manager disables synchronization between the video data and audio data at a renderer included in the processing pipeline, and wherein the one or more processing units of the processing pipeline are configured to render the video data without waiting to synchronize with audio data.

16. The sink device of claim 14, wherein, when the received media data does not include audio data, the pipeline manager configures a renderer included in the processing pipeline to render the video data.

17. The sink device of claim 14, wherein the pipeline manager increases a sample time of the video data received from the source device based on a media time applicable for a renderer included in the processing pipeline, and wherein the one or more processing units of the processing pipeline are configured to render the video data according to the increased sample time.

18. The sink device of claim 14, wherein the one or more processing units of the processing pipeline are configured to detect one of a presence or an absence of an audio time stamp in the received media data, wherein the presence of the audio time stamp indicates that the media data includes audio data.

19. The sink device of claim 14,
   wherein the one or more processing units of the processing pipeline are configured to receive stream header information from the source device during a capability negotiation period for the communication session prior to receiving the media data;
   wherein the pipeline manager configures the processing pipeline of the sink device based on the stream header information; and
   wherein, after the processing pipeline is configured, the one or more processing units of the processing pipeline are configured to notify the source device to begin transmitting the media data.

20. The sink device of claim 19, wherein the pipeline manager configures one or more of buffer sizes, rendering start-up timers, synchronization wait timers, and programmable decoder settings for the processing pipeline.

21. The sink device of claim 14, wherein, when the received media data includes audio data, the pipeline manager reduces an audio rendering start-up timer for a renderer included in the processing pipeline of the sink device, and wherein the one or more processing units of the processing pipeline are configured to synchronize the video data with the audio data, and render the synchronized audio data and video data according to the reduced start-up timer.

22. The sink device of claim 14, further comprising a decoder that is not programmable included in the processing pipeline, wherein the one or more processing units of the processing pipeline are configured to insert dummy frames into the video data at the sink device to push the decoded samples of the video data out of the decoder for rendering.

23. The sink device of claim 14, further comprising a programmable decoder included in the processing pipeline, wherein the pipeline manager configures the programmable decoder to output the decoded samples of the video data in decoding order for rendering as soon as decoding is complete.

24. The sink device of claim 14, wherein, upon receiving the media data from the source device, the one or more processing units of the processing pipeline are configured to flush one or more samples of the received media data out of a decoder included in the processing pipeline of the sink device prior to rendering the received media data, wherein the one or more samples comprise stalled samples of old media data from the source device.

25. The sink device of claim 14, wherein the one or more processing units of the processing pipeline are configured to transmit feedback information describing transport channel conditions to the source device, wherein the feedback information is used to modify a processing pipeline of the source device.

26. The sink device of claim 15, wherein the one or more processing units of the processing pipeline are configured to receive advertisements of the media data for the communication session from the source device, and send a request to join the communication session to the source device to establish the communication session at the sink device.

27. A sink device comprising:
means for establishing a communication session at the sink device with a source device in a Wireless Display (WD) system;
means for receiving media data from the source device, wherein the media data includes at least video data;
means for decoding the received media data with a processing pipeline of the sink device;
means for detecting whether the received media data includes audio data; and
when the received media data does not include audio data, means for performing accelerated rendering of the video data with the processing pipeline of the sink device without waiting to synchronize the video data with audio data.

28. The sink device of 27, further comprising, when the received media data does not include audio data, means for disabling synchronization between the video data and audio data at a renderer included in the processing pipeline, and means for rendering the video data without waiting to synchronize with audio data.

29. The sink device of claim 27, further comprising, when the received media data does not include audio data, means for configuring a renderer included in the processing pipeline to render the video data.

30. The sink device of claim 27, further comprising means for increasing a sample time of the video data received from the source device based on a media time applicable for a renderer included in the processing pipeline, and means for rendering the video data according to the increased sample time.

31. The sink device of claim 27, further comprising means for detecting one of a presence or an absence of an audio time stamp in the received media data, wherein the presence of the audio time stamp indicates that the media data includes audio data.

32. The sink device of claim 27, further comprising:
means for receiving stream header information from the source device during a capability negotiation period for the communication session prior to receiving the media data;
means for configuring the processing pipeline of the sink device based on the stream header information; and
after the processing pipeline is configured, means for notifying the source device to begin transmitting the media data.

33. The sink device of claim 27, further comprising, when the received media data includes audio data:
means for reducing an audio rendering start-up timer for a renderer included in the processing pipeline of the sink device;
means for synchronizing the video data with the audio data; and
means for rendering the synchronized audio data and video data according to the reduced start-up timer.

34. The sink device of claim 27, wherein the processing pipeline of the sink device includes a decoder that is not programmable, further comprising means for inserting dummy frames into the video data at the sink device to push the decoded samples of the video data out of the decoder for rendering.

35. The sink device of claim 27, wherein the processing pipeline of the sink device includes a programmable decoder, further comprising means for configuring the programmable decoder to output the decoded samples of the video data in decoding order for rendering as soon as decoding is complete.

36. The sink device of claim 27, further comprising, upon receiving the media data from the source device, means for flushing one or more samples of the received media data out of a decoder included in the processing pipeline of the sink device prior to rendering the received media data, wherein the one or more samples comprise stalled samples of old media data from the source device.

37. A non-transitory computer-readable medium comprising instructions that when executed in a sink device cause a programmable processor to:
establish a communication session at the sink device with a source device in a Wireless Display (WD) system;
receive media data from the source device, wherein the media data includes at least video data;
decode the received media data with a processing pipeline of the sink device;
detect whether the received media data includes audio data; and
when the received media data does not include audio data, perform accelerated rendering of the video data with the processing pipeline of the sink device without waiting to synchronize the video data with audio data.

38. The non-transitory computer-readable medium of 37, wherein, when the received media data does not include audio data, the instructions cause the programmable processor to disable synchronization between the video and audio data at a renderer included in the processing pipeline, and render the video data without waiting to synchronize with audio data.

39. The non-transitory computer-readable medium of 37, wherein, when the received media data does not include audio data, the instructions cause the programmable processor to configure a renderer included in the processing pipeline to render the video data.

40. The non-transitory computer-readable medium of 37, wherein the instructions cause the programmable processor to increase a sample time of the video data received from the source device based on a media time applicable for a renderer included in the processing pipeline, and render the video data according to the increased sample time.

41. The non-transitory computer-readable medium of 37, wherein the instructions cause the programmable processor to detect one of a presence or an absence of an audio time stamp in the received media data, wherein the presence of the audio time stamp indicates that the media data includes audio data.

42. The non-transitory computer-readable medium of 37, further comprising instructions that cause the programmable processor to:
receive stream header information from the source device during a capability negotiation period for the communication session prior to receiving the media data;
configure the processing pipeline of the sink device based on the stream header information; and
after the processing pipeline is configured, notify the source device to begin transmitting the media data.

43. The non-transitory computer-readable medium of 37, further comprising, when the received media data includes audio data, instructions that cause the programmable processor to:
reduce an audio rendering start-up timer for a renderer included in the processing pipeline of the sink device;
synchronize the video data with the audio data; and
render the synchronized audio data and video data according to the reduced start-up timer.

44. The non-transitory computer-readable medium of 37, wherein the processing pipeline of the sink device includes a decoder that is not programmable, further comprising instructions that cause the programmable processor to insert dummy frames into the video data at the sink device to push the decoded samples of the video data out of the decoder for rendering.

45. The non-transitory computer-readable medium of 37, wherein the processing pipeline of the sink device includes a programmable decoder, further comprising instructions that cause the programmable processor to configure the programmable decoder to output the decoded samples of the video data in decoding order for rendering as soon as decoding is complete.

46. The non-transitory computer-readable medium of 37, further comprising, upon receiving the media data from the source device, instructions that cause the programmable processor to flush one or more samples of the received media data out of a decoder included in the processing pipeline of the sink device prior to rendering the received media data, wherein the one or more samples comprise stalled samples of old media data from the source device.

* * * * *